US008579763B2

(12) United States Patent
Nakade et al.

(10) Patent No.: US 8,579,763 B2
(45) Date of Patent: Nov. 12, 2013

(54) SHIFT-BY-WIRE GEARSHIFT CONTROL APPARATUS

(75) Inventors: Yusuke Nakade, Toyota (JP); Naoki Itazu, Nagoya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/511,376

(22) PCT Filed: Nov. 25, 2009

(86) PCT No.: PCT/JP2009/069841
§ 371 (c)(1),
(2), (4) Date: May 23, 2012

(87) PCT Pub. No.: WO2011/064843
PCT Pub. Date: Jun. 3, 2011

(65) Prior Publication Data
US 2012/0283066 A1    Nov. 8, 2012

(51) Int. Cl.
*F16H 61/16* (2006.01)
(52) U.S. Cl.
USPC ........................................................ 477/126
(58) Field of Classification Search
None
See application file for complete search history.

(56) References Cited

U.S. PATENT DOCUMENTS

| 5,409,434 A * | 4/1995 | Furukawa et al. ............. 477/131 |
| 5,709,140 A * | 1/1998 | Hirose ............................. 91/459 |
| 6,364,801 B1 * | 4/2002 | Asatsuke et al. .............. 475/119 |
| 6,432,015 B1 * | 8/2002 | Takahashi ...................... 475/116 |
| 7,190,138 B2 * | 3/2007 | Kamio et al. .................. 318/445 |
| 7,312,595 B2 * | 12/2007 | Kamio et al. .................. 318/701 |
| 7,349,770 B2 * | 3/2008 | Matsuzaki et al. ................ 701/1 |
| 7,377,192 B2 * | 5/2008 | Kimura et al. ................... 74/335 |
| 7,540,824 B2 * | 6/2009 | Hinami et al. ................. 477/126 |
| 7,621,837 B2 * | 11/2009 | Sato et al. ...................... 475/127 |
| 8,224,541 B2 * | 7/2012 | Yoshioka et al. ............... 701/62 |
| 2006/0252593 A1 | 11/2006 | Inoue et al. |
| 2009/0152070 A1 | 6/2009 | Nakamura et al. |
| 2010/0256880 A1 | 10/2010 | Sato |

FOREIGN PATENT DOCUMENTS

| EP | 2 072 865 A2 | 6/2009 |
| JP | 2004-125061 | 4/2004 |
| JP | 2006-313001 | 11/2006 |
| JP | 2008-69907 | 3/2008 |
| JP | 2008-69908 | 3/2008 |
| JP | 2009-127841 | 6/2009 |
| JP | 2009-144898 | 7/2009 |
| WO | WO 2009/069384 A1 | 6/2009 |

OTHER PUBLICATIONS

International Search Report in International Application No. PCT/JP2009/069841; Mailing Date: Jan. 19, 2010.

* cited by examiner

*Primary Examiner* — Dirk Wright
(74) *Attorney, Agent, or Firm* — Finnegan, Henderson, Farabow, Garrett & Dunner, LLP

(57) ABSTRACT

In a shift-by-wire gearshift control apparatus, even if a switching anomaly in which switching between forward and reverse gears is not possible has occurred, transmission of driving power to the output shaft 10 can be interrupted as quickly as possible. In the case of the occurrence of a switching anomaly in which switching from a forward gear stage to a reverse gear stage, or vice versa, is not possible, as a path for draining engaging hydraulic pressure supplied to a frictional engagement element (C1 to C4, B1, B2) involved in establishing the current gear stage, the hydraulic control circuit 4 secures an anomaly drain path (91 or 92) that is shorter than a normal drain path (81, 82 or 83) secured by the hydraulic control circuit 4 during normal switching.

15 Claims, 13 Drawing Sheets

FIG.6

|      | C1 | C2 | C3 | C4 | B1 | B2 | F |
|------|----|----|----|----|----|----|---|
| P    | ×  | ×  | ×  | ×  | ×  | ×  | × |
| R    | ×  | ×  | ×  | ○  | ×  | ○  | × |
| N    | ×  | ×  | ×  | ×  | ×  | ×  | × |
| 1st  | ○  | ×  | ×  | ×  | ×  | ◎  | △ |
| 2nd  | ○  | ×  | ×  | ×  | ○  | ×  | × |
| 3rd  | ○  | ×  | ○  | ×  | ×  | ×  | × |
| 4th  | ○  | ×  | ×  | ○  | ×  | ×  | × |
| 5th  | ○  | ○  | ×  | ×  | ×  | ×  | × |
| 6th  | ×  | ○  | ×  | ○  | ×  | ×  | × |
| 7th  | ×  | ○  | ○  | ×  | ×  | ×  | × |
| 8th  | ×  | ○  | ×  | ×  | ○  | ×  | × |

○ A circle indicates an engaged state
× A cross indicates a disengaged state
◎ A double circle indicates an engaged state during engine brake
△ A triangle indicates an engaged state only during driving

SHIFT-BY-WIRE GEARSHIFT CONTROL APPARATUS

CROSS-REFERENCE TO RELATED APPLICATIONS

This application is a national phase application of International Application No. PCT/JP2009/069841, filed Nov. 25, 2009, the contents of which are incorporated herein by reference.

TECHNICAL FIELD

The present invention relates to a shift-by-wire gearshift control apparatus that, in response to a target range signal output as a result of a driver operation, switches an automatic transmission to a gear stage corresponding to the target range.

BACKGROUND ART

With an automatic transmission mounted in a vehicle or the like, by the driver of the vehicle operating a select lever in the cabin to select a target range, an operation for establishing a gear stage that corresponds to the selected target range is performed.

According to conventional technology, the select lever and a manual shaft are mechanically coupled via a cable, and when the select lever is operated, the manual shaft is driven for rotation via the cable in association with the operation, and a manual valve is shifted to a position selecting an appropriate range position (P, R, N or D) in association with the rotational movement of the manual shaft. Hydraulic pressure control for causing an appropriate frictional engagement element in a gearshift mechanism unit in the automatic transmission to be engaged or disengaged is performed according to the range position of the manual valve, whereby an appropriate gear stage in the automatic transmission is secured.

In recent years, a shift-by-wire gearshift control system has been conceived (see, for example, Patent Literature 1). With this gearshift control system, by causing the select lever and the manual valve to be uncoupled and a switch operation to be performed with the select lever, a target range signal is output, and the manual shaft is driven for rotation by an actuator in response to the target range signal. Shifting the manual valve to a range position (P, R, N or D) corresponding to the target range in association with the rotational movement of the manual shaft, and performing hydraulic pressure control for causing an appropriate frictional engagement element in the gearshift mechanism unit of the automatic transmission to be engaged or disengaged according to the range position of the manual valve are the same as described above.

The frictional engagement elements are generally clutches and brakes, and configured to be engaged by supply of engaging hydraulic pressure and disengaged by draining the engaging hydraulic pressure. In the hydraulic control circuit, various types of valves are used to supply or drain engaging hydraulic pressure to and from the frictional engagement elements. In the case of draining engaging hydraulic pressure while the engaging hydraulic pressure is being supplied to a frictional engagement element, the engaging hydraulic pressure supplied to the frictional engagement element is caused to flow in the reverse direction to the supply path.

With the shift-by-wire gearshift control system mentioned above, there is a possibility that, for example, an unintentional operational failure or the like in the actuator or the manual valve might cause a switching anomaly in which the target range (target gear stage) corresponding to a driver operation of the select lever and the actually established gear stage (actual gear stage) established in the automatic transmission do not match. If such a switching anomaly occurs when, for example, switching from the forward gear stage to the reverse gear stage, or vice versa, the vehicle may move in a direction opposite to the target direction.

To address the occurrence of switching anomalies, the conventional technique described in Patent Literature 1 mentioned above cuts off a power transmission path from the engine to the driving wheels. In order to cut off the power transmission path, supply of engaging hydraulic pressure is stopped and the engaging hydraulic pressure is drained so as to disengage the frictional engagement elements (clutches and brakes) involved in establishing the actual gear stage.

CITATION LIST

Patent Literature

[PTL 1] JP 2004-125061A

DISCLOSURE OF INVENTION

Technical Problems

The conventional technique of Patent Literature 1 mentioned above takes measures to cause the vehicle to not move upon the occurrence of a switching anomaly, in which the target range and the actual gear stage do not match, in the shift-by-wire gearshift control system due to some kind of trouble, but there is still room for improvement in the following respects.

For example, according to one of the measures of the above-mentioned conventional technique, supply of engaging hydraulic pressure to a frictional engagement element (clutch or brake) involved in establishing the actual gear stage is stopped, and the engaging hydraulic pressure is caused to flow in the reverse direction to the supply path and drain. As can be seen from this, the drain path for engaging hydraulic pressure used in the case of the occurrence of a switching anomaly is the same as the drain path used during normal operation. Accordingly, the time required for draining, or in other words, the time required to disengage the frictional engagement element is relatively long.

In order to facilitate adjustment of line pressure of the hydraulic control circuit, in some cases, the drain port of a valve located in the most downstream position of the drain path is set to be smaller than that of the oil paths. In such a case, the time required for draining will be even longer. Also, if the temperature of oil in the hydraulic control circuit is low, the viscosity of the oil will increase, and thus an even longer time is required for draining.

Under such circumstances, it is an object of the present invention to provide a shift-by-wire gearshift control apparatus in which even if a switching anomaly in which switching between a forward gear stage and a reverse gear stage is not possible occurs, transmission of driving power to the output shaft can be interrupted as quickly as possible.

Means For Solving the Problems

The present invention is a shift-by-wire gearshift control apparatus that, in response to a target range signal output as a result of a driver operation, switches an automatic transmission to a gear stage corresponding to the target range, the shift-by-wire gearshift control apparatus including: a gearshift mechanism unit that includes a plurality of frictional engagement elements for establishing the gear stage and that changes rotation of an input shaft and outputs the rotation to an output shaft; a hydraulic control circuit that secures a supply path for engaging hydraulic pressure for engaging a necessary frictional engagement element to establish the gear stage corresponding to the target range; an operation unit for outputting a target range signal in response to the driver operation; a command unit for causing the hydraulic control circuit to supply engaging hydraulic pressure for the necessary frictional engagement element in response to the target range signal; and a management unit for, in a case of occurrence of a switching anomaly in which switching from a forward gear stage to a reverse gear stage or switching from the reverse gear stage to the forward gear stage is not possible, causing the hydraulic control circuit to secure an anomaly drain path that is shorter than a normal drain path that is secured by the hydraulic control circuit during normal switching operation, as a path for draining engaging hydraulic pressure supplied to a frictional engagement element involved in establishing an actual gear stage.

The present invention is a shift-by-wire gearshift control apparatus, and therefore considering the occurrence of, for example, a switching anomaly in which switching from the forward gear stage to the reverse gear stage or vice versa is not possible, due to an unintentional operational failure in the command unit, a configuration is devised that can cope with such switching anomalies.

Specifically, with the above configuration, when a switching anomaly as described above occurs, the engaging hydraulic pressure supplied to a frictional engagement element involved in establishing the currently established actual gear stage is drained, thereby causing the frictional engagement element to be disengaged and interrupting transmission of driving power to the output shaft. Furthermore, as the drain path, an anomaly drain path that is shorter than a normal drain path is used. Accordingly, the time required for draining, or in other words, the time required to disengage the frictional engagement element can be shortened as compared to the case where the normal drain path is used.

Preferably, in the case of the occurrence of the switching anomaly, the management unit first determines whether or not oil temperature in the hydraulic control circuit is less than a threshold value, and causes the hydraulic control circuit to secure the anomaly drain path if the oil temperature is less than the threshold value, and causes the hydraulic control circuit to secure the normal drain path if the oil temperature is greater than or equal to the threshold value.

With this configuration, at the time of draining the engaging hydraulic pressure supplied to a frictional engagement element involved in establishing the current gear stage, if the oil temperature is low, or in other words, if the oil viscosity is high and the flowability is poor, the short anomaly drain path is used. On the other hand, if the oil temperature is high, or in other words, if the oil viscosity is low and the flowability is good, the normal drain path is used.

Accordingly, even if a switching anomaly as described above occurs when the oil temperature is low, or in other words, when the oil viscosity is high and the flowability is poor, the time required for draining, or in other words, the time required to disengage the frictional engagement element can be shortened.

Preferably, the management unit includes an identification unit that identifies a currently established actual gear stage and an anomaly determining unit that determines whether or not the switching anomaly has occurred, and the anomaly determining unit checks whether or not the target range and the actual gear stage identified by the identification unit match. Here, an implementation of the present invention is clarified by specifying the configuration of the management unit.

Preferably, the hydraulic control circuit includes a plurality of solenoid valves for individually supplying engaging hydraulic pressure to the respective frictional engagement elements, and a cutoff valve for prevention of tie-up that is provided in a path for supplying engaging hydraulic pressure to a frictional engagement element involved in establishing the forward gear stage and that interrupts or permits supply of engaging hydraulic pressure to the frictional engagement element from the solenoid valve as necessary, and the management unit sets, as an anomaly drain path secured in the case of the occurrence of the switching anomaly from the forward gear stage to the reverse gear stage, a path that causes the engaging hydraulic pressure supplied to the frictional engagement element involved in establishing the forward gear stage to drain from a drain port of the cutoff valve.

The term "tie-up" used herein, which is known as a technical term for automatic transmissions, refers to a phenomenon in which, during the process in which a plurality of frictional engagement elements are simultaneously engaged and disengaged in order to switch the current gear stage to the target gear stage, a lag occurs between the progress of engagement and the progress of disengagement, temporarily causing a conflict.

Here, an implementation of the present invention is clarified by specifying the configuration of the hydraulic control circuit, the anomaly drain path and the normal drain path. With this configuration, as the normal drain path during normal switching operation, it is possible to obtain a path that causes the engaging hydraulic pressure to flow in the reverse direction to the supply path thereof and drain from the drain port of the solenoid valve. In this case, it is clear that the anomaly drain path will be shorter than the normal drain path.

Preferably, the command unit includes a manual valve for supplying the engaging hydraulic pressure to an appropriate frictional engagement element via an appropriate solenoid valve, an actuator for actuating the manual valve, and a control unit for controlling an operation of the solenoid valve and the actuator in response to the target range signal. Here, an implementation of the present invention is clarified by specifying the configuration of the command unit.

Preferably, the hydraulic control circuit further includes a valve for supplying control hydraulic pressure for opening a drain port to the cutoff valve in order to secure the anomaly drain path, and the control hydraulic pressure for opening a drain port supplied to the cutoff valve is caused to drain after draining from the anomaly drain path.

Preferably, the gearshift mechanism unit includes a double pinion type front planetary gear unit that is provided on an upstream side in a power transmission direction and a ravigneaux type rear planetary gear unit that is provided on a downstream side in the power transmission direction, and a carrier of the front planetary gear unit is coupled to the input shaft and a ring gear of the rear planetary gear unit is coupled to the output shaft. The frictional engagement elements include: a first clutch for causing a ring gear of the front planetary gear unit and a small-diameter sun gear of the rear planetary gear unit to be capable of integral rotation or relative rotation; a second clutch for causing the input shaft and a carrier of the rear planetary gear unit to be capable of integral rotation or relative rotation; a third clutch for causing the ring gear of the front planetary gear unit and a large-diameter sun gear of the rear planetary gear unit to be capable of integral rotation or relative rotation; a fourth clutch for causing the carrier of the front planetary gear unit and the large-diameter sun gear of the rear planetary gear unit to be capable of integral rotation or relative rotation; an intermediate rotator for integrally coupling the large-diameter sun gear of the rear planetary gear unit, a free side friction plate of the third clutch and a free side friction plate of the fourth clutch; a first brake for causing the intermediate rotator to be rotatable or non-rotatable; and a second brake for causing the carrier of the rear planetary gear unit to be rotatable or non-rotatable, and a first forward gear stage is established when only the first clutch is engaged, and a reverse gear stage is established when the fourth clutch and the second brake are engaged.

Here, an implementation of the present invention is clarified by specifying the configurations of the gearshift mechanism unit and the frictional engagement element, and conditions for establishing the first forward gear stage and the reverse gear stage.

Preferably, the hydraulic control circuit includes a plurality of solenoid valves for individually supplying engaging hydraulic pressure to the first to fourth clutches and the first and second brakes, and a cutoff valve for prevention of tie-up that is provided between the first clutch and a solenoid valve for supplying engaging hydraulic pressure thereto and that interrupts or permits supply of engaging hydraulic pressure to the first clutch as necessary, and the management unit sets, as an anomaly drain path secured in the case of the occurrence of the switching anomaly from the first forward gear stage to the reverse gear stage, a path that causes the engaging hydraulic pressure supplied to the first clutch to drain from a drain port of the cutoff valve.

Here, an implementation of the present invention is clarified by specifying the configuration of the hydraulic control circuit and the anomaly drain path secured in the case of the occurrence of a switching anomaly from the first forward gear stage to the reverse gear stage. With this configuration, as the normal drain path during normal switching operation, it is possible to obtain a path that causes the engaging hydraulic pressure to flow in the reverse direction to the supply path thereof and drain. In this case, it is clear that the anomaly drain path will be shorter than the normal drain path.

Preferably, the hydraulic control circuit further includes a valve for supplying control hydraulic pressure for opening a drain port to the cutoff valve in order to secure the anomaly drain path, and the control hydraulic pressure for opening a drain port supplied to the cutoff valve is caused to drain after draining from the anomaly drain path.

Preferably, the hydraulic control circuit includes a plurality of solenoid valves for individually supplying engaging hydraulic pressure to the first to fourth clutches and the first and second brakes, and a cutoff valve for prevention of tie-up that is provided between the fourth clutch and a solenoid valve for supplying engaging hydraulic pressure thereto and that interrupts or permits supply of engaging hydraulic pressure to the fourth clutch as necessary, in the hydraulic control circuit, a distance between the second brake and a solenoid valve for supplying engaging hydraulic pressure thereto is set shorter than a distance between the fourth clutch and the solenoid valve for supplying engaging hydraulic pressure thereto, and the management unit sets, as an anomaly drain path secured in the case of the occurrence of the switching anomaly from the reverse gear stage to the first forward gear stage, a path that causes the engaging hydraulic pressure supplied to the second brake to drain from a drain port of a valve for supplying engaging hydraulic pressure to the second brake.

Here, an implementation of the present invention is clarified by specifying the configuration of the hydraulic control circuit and the anomaly drain path secured in the case of the occurrence of a switching anomaly from the reverse gear stage to the first forward gear stage. It is thereby clear that the anomaly drain path secured in the case of the occurrence of a switching anomaly from the reverse gear stage to the first forward gear stage will be shorter.

Effects of the Invention

According to the present invention, in a shift-by-wire gearshift control apparatus, even in the event of the occurrence of a switching anomaly in which switching between the forward and reverse gears is not possible, transmission of driving power to the output shaft can be interrupted as quickly as possible.

BRIEF DESCRIPTION OF DRAWINGS

FIG. 6 is an engagement table of respective clutches and respective brakes of the gearshift mechanism unit shown in FIG. 2.

MODE FOR CARRYING OUT THE INVENTION

Hereinafter, a best mode for carrying out the present invention will be described with reference to the drawings.

FIGS. 1 to 13 show an embodiment of the present invention. Prior to describing characteristic parts of the present invention, the schematic configurations of an automatic transmission 1 to which features of the present invention have been applied and a power train of a vehicle equipped with the automatic transmission will be described.

Figure 1:
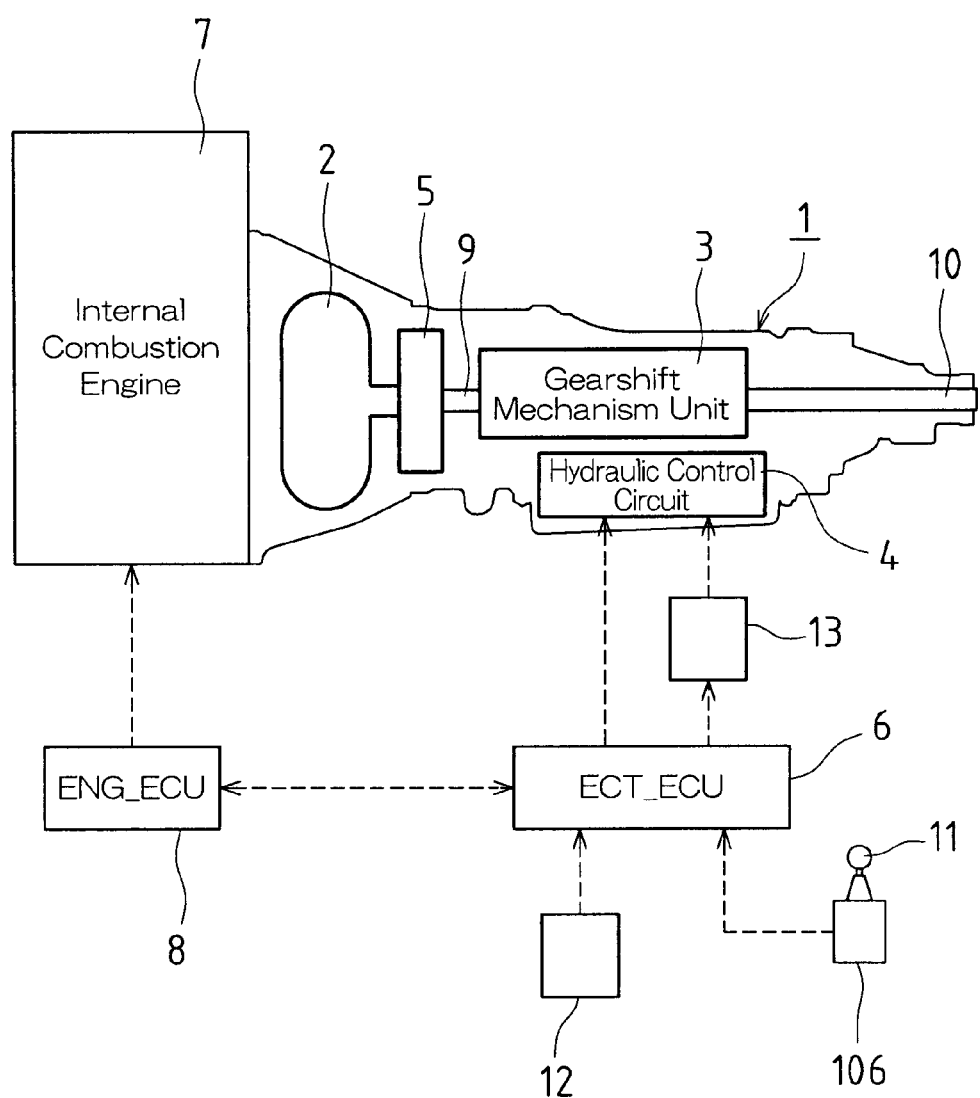
FIG. 1 is a diagram showing the schematic configuration of a power train mounted in a vehicle that uses an automatic transmission to which the present invention is applied.

The automatic transmission 1 shown in FIG. 1 is for use in a front-engine/rear-drive (FR) power train, and primarily includes a torque converter 2 serving as a hydraulic power transmission apparatus, a gearshift mechanism unit 3, a hydraulic control circuit 4 and an oil pump 5.

The automatic transmission 1 is controlled by an ECT (Electronic Controlled Automatic Transmission)_ECU (Electronic Control Unit) 6, and is configured to be capable of providing a shift to, for example, eight forward gear stages and a reverse gear stage.

In FIG. 1, reference numeral 7 indicates an internal combustion engine (engine), and the operation of the internal combustion engine 7 is controlled by an ENG_ECU 8 serving as a control apparatus. The ENG_ECU 8 is connected to the ECT_ECU 6 so as to be capable of mutual transmission and reception. A power train is configured including the automatic transmission 1 and the internal combustion engine 7.

Figure 2:
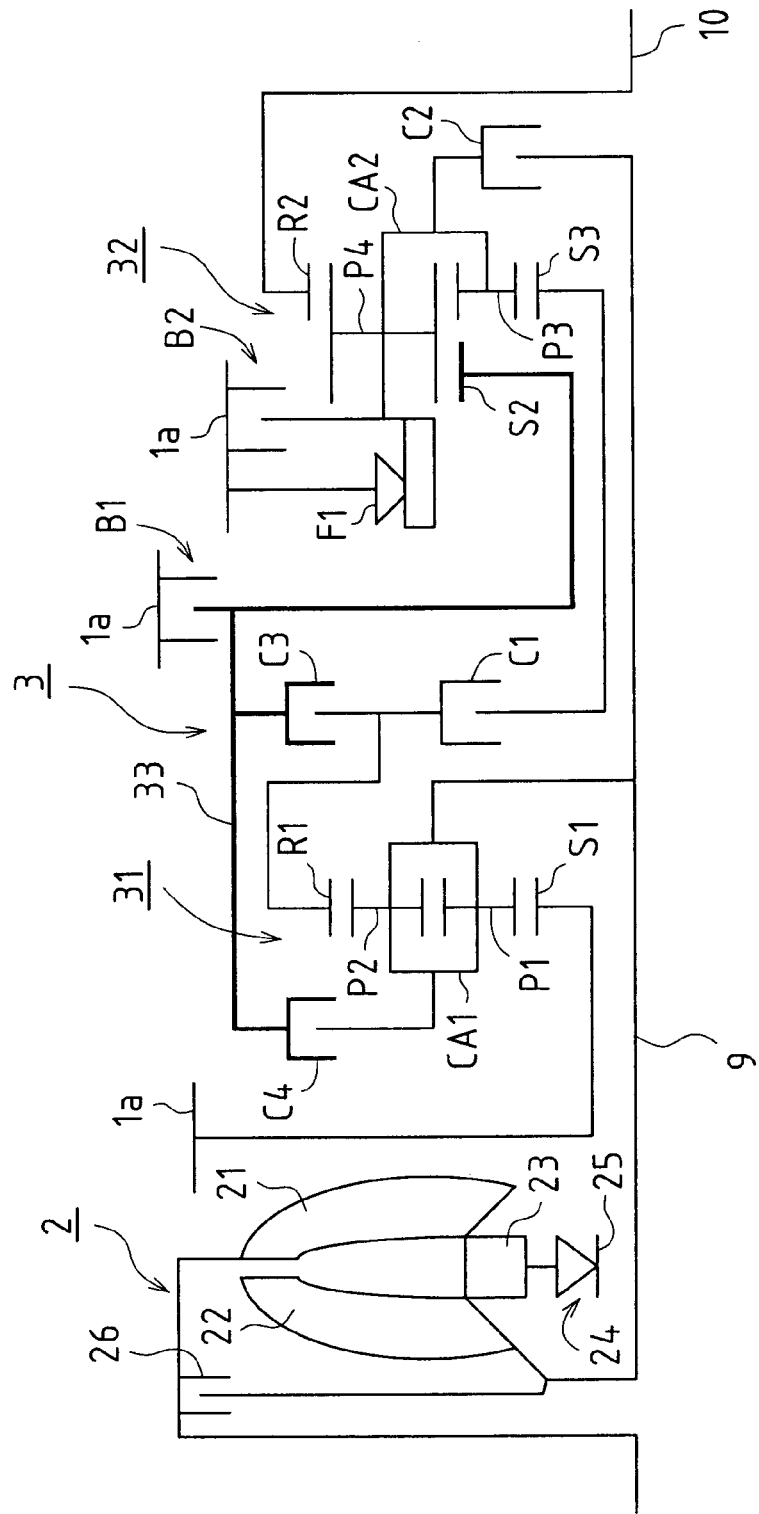
FIG. 2 is a schematic diagram of the automatic transmission shown in FIG. 1.

The torque converter 2 is rotationally coupled to the internal combustion engine 7, and includes as shown in FIG. 2, a pump impeller 21, a turbine runner 22, a stator 23, a one-way clutch 24, a stator shaft 25, and a lock-up clutch 26.

The one-way clutch 24 supports the stator 23 so as to permit the stator 23 to rotate in only one direction in a case 1a of the gearshift mechanism unit 3. The stator shaft 25 fixes an inner race of the one-way clutch 24 to the case 1a. The lock-up clutch 26 directly couples the pump impeller 21 and the turbine runner 22.

The gearshift mechanism unit 3 changes rotational power input from the torque converter 2 to an input shaft 9 and outputs the power to an output shaft 10. As shown in FIG. 2, the gearshift mechanism unit 3 includes a front planetary gear unit 31, a rear planetary gear unit 32, an intermediate drum 33 serving as an intermediate rotator, first to fourth clutches C1 to C4 and first and second brakes B1 and B2.

The front planetary gear unit 31 is of double pinion type, and includes a first sun gear S1, a first ring gear R1, a plurality of inner pinion gears P1, a plurality of outer pinion gears P2, and a first carrier CA1.

The first sun gear S1 is fixed to the case 1a and thus incapable of rotation, and the first ring gear R1 is supported by the intermediate drum 33 via the third clutch C3 so as to be capable of integral rotation or relative rotation. The first sun gear S1 is coaxially inserted on the inner diameter side of the first ring gear R1.

The inner pinion gears P1 and the outer pinion gears P2 are provided at several locations along the circumference of a facing annular space between the first sun gear S1 and the first ring gear R1. The inner pinion gears P1 are engaged with the first sun gear S1, and the outer pinion gears P2 are engaged with the inner pinion gears P1 and the first ring gear R1.

The first carrier CA1 rotatably supports both the pinion gears P1 and P2. A central axis portion of the first carrier CA1 is integrally coupled to the input shaft 9, and respective support axis portions supporting the pinion gears P1 and P2 in the first carrier CA1 are supported via the fourth clutch C4 so as to be capable of integral rotation or relative rotation with respect to the intermediate drum 33.

The intermediate drum 33 is rotatably disposed on the outer diameter side of the first ring gear R1, and supported by the case 1a via the first brake B1 so as to be incapable of rotation or capable of relative rotation.

The rear planetary gear unit 32 is of ravigneaux type, and includes a second sun gear S2 having a large diameter, a third sun gear S3 having a small diameter, a second ring gear R2, a plurality of short pinion gears P3, a plurality of long pinion gears P4, and a second carrier CA2.

The second sun gear S2 is coupled to the intermediate drum 33. The third sun gear S3 is coupled to the first ring gear R1 of the front planetary gear unit 31 via the first clutch C1 so as to be capable of integral rotation or relative rotation. The second ring gear R2 is integrally coupled to the output shaft 10.

The short pinion gears P3 are engaged with the third sun gear S3. The long pinion gears P4 are engaged with the second sun gear S2 and the second ring gear R2 and also engaged with the third sun gear S3 via the short pinion gears P3.

The second carrier CA2 rotatably supports the short pinion gears P3 and the long pinion gears P4. A central axis portion of the second carrier CA2 is coupled to the input shaft 9 via the second clutch C2, and respective support axis portions supporting the pinion gears P3 and P4 in the second carrier CA2 are supported by the case 1a via the second brake B2 and a one-way clutch F1.

The first to fourth clutches C1 to C4 and the first and second brakes B1 and B2 are wet-type multiple-disc frictional engagement apparatuses that utilize the viscosity of oil. Although not shown in detail, engagement and disengagement operations of the first to fourth clutches C1 to C4 and the first and second brakes B1 and B2 are performed individually by hydraulic pressure servos 51 to 56. In other words, a configuration that includes the first to fourth clutches C1 to C4, the first and second brakes B1 and B2 and the hydraulic pressure servos 51 to 56 corresponds to the frictional engagement element recited in the claims.

The first clutch C1 causes the third sun gear S3 of the rear planetary gear unit 32 to be in an engaged state in which integral rotation is possible or a disengaged state in which relative rotation is possible, with respect to the first ring gear R1 of the front planetary gear unit 31.

The second clutch C2 causes the second carrier CA2 of the rear planetary gear unit 32 to be in an engaged state in which integral rotation is possible or a disengaged state in which relative rotation is possible, with respect to the input shaft 9.

The third clutch C3 causes the first ring gear R1 of the front planetary gear unit 31 to be in an engaged state in which integral rotation is possible or a disengaged state in which relative rotation is possible, with respect to the intermediate drum 33.

The fourth clutch C4 causes the first carrier CA1 of the front planetary gear unit 31 to be in an engaged state in which integral rotation is possible or a disengaged state in which relative rotation is possible, with respect to the intermediate drum 33.

The first brake B1 causes the intermediate drum 33 to be in an engaged state in which integral rotation is not possible or a disengaged state in which relative rotation is possible, with respect to the case 1a of the automatic transmission 1.

The second brake B2 causes the second carrier CA2 of the rear planetary gear unit 32 to be in an engaged state in which integral rotation is not possible or a disengaged state in which relative rotation is possible, with respect to the case 1a.

The one-way clutch F1 permits the second carrier CA2 of the rear planetary gear unit 32 to rotate in only one direction.

Figure 3:
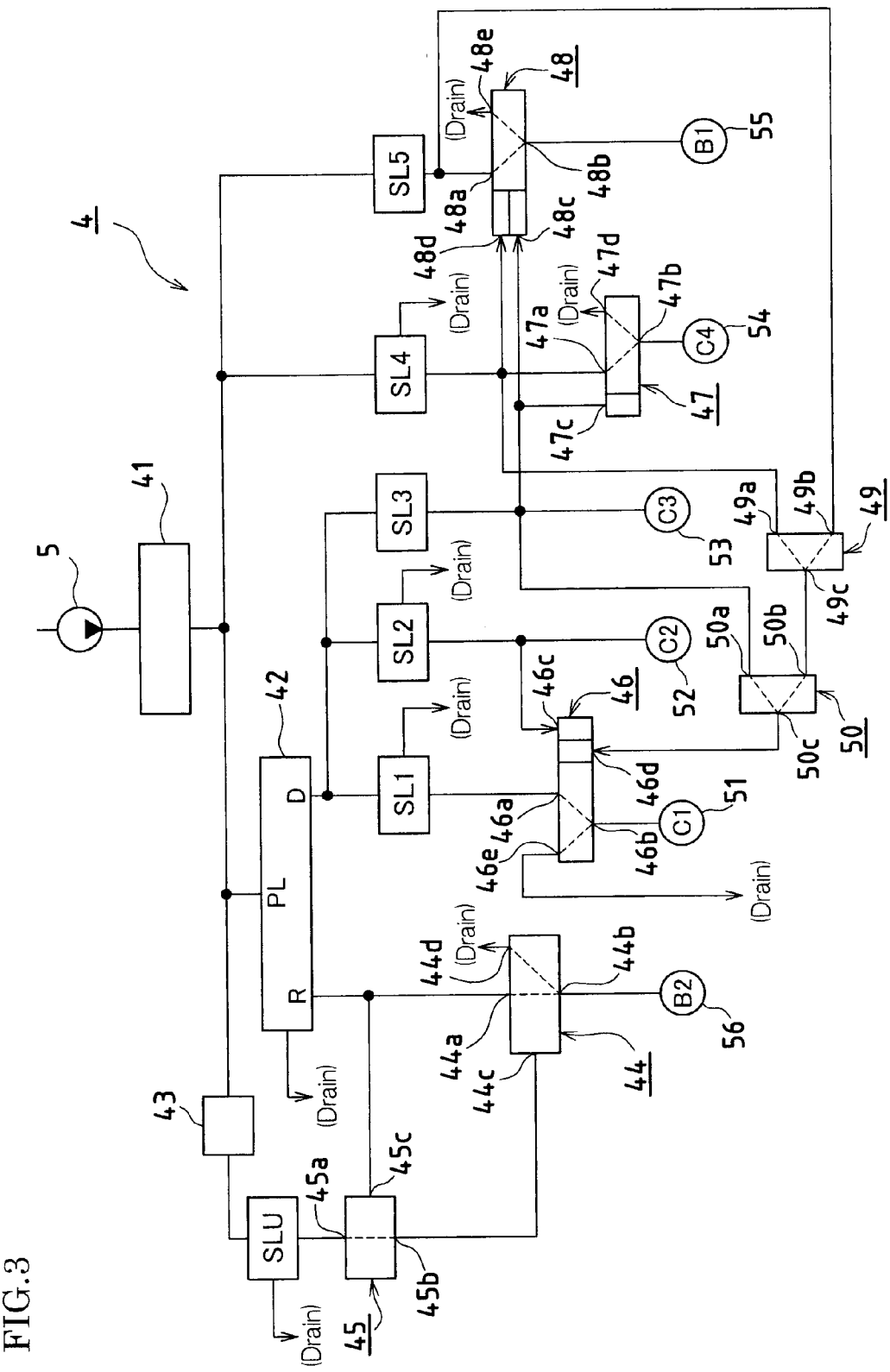
FIG. 3 is a diagram showing the configuration of a hydraulic control circuit shown in FIG. 1.

The hydraulic control circuit 4 establishes any gear of the gearshift mechanism unit 3, and primarily includes, as shown in FIG. 3, a pressure control valve 41, a manual valve 42, a solenoid modulator valve 43, a linear solenoid valve SLU, a plurality of linear solenoid valves SL1, SL2, SL3, SL4 and SL5, a B2 control valve 44, a lock-up relay valve 45, a plurality of cutoff valves 46, 47 and 48 for prevention of tie-up, a plurality of switching valves 49 and 50, and the like.

The solenoid modulator valve 43, the linear solenoid valve SLU and the linear solenoid valves SL1, SL2, SL3, SL4 and SL5 are not shown in detail in the drawings because their basic configuration and operation is the same as conventional ones. By these solenoids being excited by control current from the ECT_ECU 6, the solenoids move their respective spool valves to a position that strikes an appropriate balance with the spring force of the compression spring, whereby the necessary port is opened or closed, or the opening degree is adjusted (increased or decreased).

Similarly, the B2 control valve 44, the lock-up relay valve 45, the cutoff valves 46, 47 and 48 for prevention of tie-up, and the switching valves 49 and 50 are not shown in detail in the drawings because their basic configuration and operation is also the same as conventional ones. By causing respective spool valves to move to a position that strikes an appropriate balance with the spring force of the compression spring by appropriately input hydraulic pressure, the necessary port is opened or closed.

Although not shown in detail in the drawings, the pressure control valve 41 is a primary regulator valve or the like, and adjusts the hydraulic pressure generated by the oil pump 5 to a predetermined line pressure and inputs the hydraulic pressure to an input port PL of the manual valve 42 or the solenoid modulator valve 43.

The manual valve 42 is a generally known spool type valve. A spool valve 42a of the manual valve 42 is slid to a P, R, N or D position by a range switching mechanism 13, which will be described below, according to a target range (neutral range N, forward driving range D, reverse driving range R or parking range P) selected by the driver operating a select lever 11 or a parking switch 12, whereby the line pressure input from the pressure control valve 41 is supplied to the linear solenoid valves SL1, SL2, SL3, SL4 and SL5 and the B2 control valve 44 as P, R, N or D range pressure.

The linear solenoid valves SL1, SL2, SL3, SL4 and SL5 individually supply engaging hydraulic pressure to the hydraulic pressure servos 51 to 55 of the first to fourth clutches C1 to C4 and the first brake B1, as necessary.

The solenoid modulator valve 43 supplies regulation pressure obtained as a result of reducing the line pressure supplied from the pressure control valve 41, to the linear solenoid valve SLU as control hydraulic pressure.

The linear solenoid valve SLU supplies, to the B2 control valve 44, the control hydraulic pressure for causing the B2 control valve 44 to be in a drain state. The linear solenoid valve SLU is provided with a drain port for draining the control hydraulic pressure supplied to the B2 control valve 44.

The B2 control valve 44 supplies engaging hydraulic pressure to the hydraulic pressure servo 56 of the second brake B2, as necessary. The B2 control valve 44 is provided with at least a first port 44a to which engaging hydraulic pressure (R range pressure) to be supplied from the manual valve 42 to the hydraulic pressure servo 56 of the second brake B2 is input, a second port 44b for outputting the engaging hydraulic pressure input to the first port 44a to the hydraulic pressure servo 56 of the second brake B2, a third port 44c to which the control hydraulic pressure serving as a port switching signal from the linear solenoid valve SLU is input, and a drain port 44d for draining the engaging hydraulic pressure supplied to the hydraulic pressure servo 56 of the second brake B2.

Regarding the operation of the B2 control valve 44, when the port switching signal is input to the third port 44c, the first port 44a and the second port 44b are brought into communication with each other and the drain port 44d is closed, which permits supply of engaging hydraulic pressure to the hydraulic pressure servo 56 of the second brake B2. When, on the other hand, the port switching signal is not input to the third port 44c, the first port 44a is closed and the second port 44b and the drain port 44d are brought into communication with each other, which causes the engaging hydraulic pressure supplied to the hydraulic pressure servo 56 of the second brake B2 to drain.

Specifically, the linear solenoid valves SL1, SL2, SL3, SL4 and SL5 are of high flow rate type, whereas the linear solenoid valve SLU is of lower flow rate type than the linear solenoid valves SL1, SL2, SL3, SL4 and SL5. However, the line pressure supplied from the pressure control valve 41 to the input port PL of the manual valve 42 or the solenoid modulator valve 43 is set to a pressure supplied to the linear solenoid valves SL1, SL2, SL3, SL4 and SL5 which are of high flow rate type. For this reason, the line pressure generated by the pressure control valve 41 is reduced by the solenoid modulator valve 43 before the line pressure is supplied to the linear solenoid valve SLU.

The lock-up relay valve 45 is controlled so as to supply, to the lock-up clutch 26 of the automatic transmission 1, engaging hydraulic pressure for engaging the lock-up clutch 26 and to permit or interrupt supply of control hydraulic pressure from the linear solenoid valve SLU to the B2 control valve 44. The lock-up relay valve 45 is provided with at least a first port 45a to which control hydraulic pressure to be supplied from the linear solenoid valve SLU to the B2 control valve 44 is input, a second port 45b for outputting the control hydraulic pressure input to the first port 45a, and a third port 45c to which engaging hydraulic pressure (R range pressure) supplied from an output port R of the manual valve 42 to the B2 control valve 44 is input.

Regarding the operation of the lock-up relay valve 45, when the engaging hydraulic pressure (R range pressure) is input to the third port 45c, the first port 45a and the second port 45b are brought into communication with each other. When the engaging hydraulic pressure (R range pressure) is not input to the third port 45c, the first port 45a and the second port 45b are cut off. In the state in which the first port 45a and the second port 45b are in communication with each other, supply of control hydraulic pressure from the linear solenoid valve SLU to the B2 control valve 44 is enabled. In the state in which the first port 45a and the second port 45b are cut off, supply of control hydraulic pressure from the linear solenoid valve SLU to the B2 control valve 44 is disabled.

The first cutoff valve 46 is a fail safe valve provided along a hydraulic pressure flow path connecting the first linear solenoid valve SL1 and the hydraulic pressure servo 51 of the first clutch C1. The first cutoff valve 46 is provided with a first port 46a to which engaging hydraulic pressure to be supplied from the first linear solenoid valve SL1 to the hydraulic pressure servo 51 of the first clutch C1 is input, a second port 46b for outputting the engaging hydraulic pressure input to the first port 46a to the hydraulic pressure servo 51 of the first clutch C1, a third port 46c to which engaging hydraulic pressure to be supplied from the second linear solenoid valve SL2 to the hydraulic pressure servo 52 of the second clutch C2 is input, a fourth port 46d to which signal hydraulic pressure output from the second switching valve 50 is input, and a drain port 46e.

Regarding the operation of the first cutoff valve 46, when the engaging hydraulic pressure to be supplied from the second linear solenoid valve SL2 to the hydraulic pressure servo 52 of the second clutch C2 is input to the third port 46c, and the signal hydraulic pressure output from the second switching valve 50 is input to the fourth port 46d, the first port 46a is closed so as to interrupt the supply of engaging hydraulic pressure from the first linear solenoid valve SL1 to the hydraulic pressure servo 51 of the first clutch C1, and the second port 46b and the drain port 46e are brought into communication with each other so as to drain the engaging hydraulic pressure supplied to the hydraulic pressure servo 51 of the first clutch C1.

The second cutoff valve 47 is a fail safe valve provided along a hydraulic pressure flow path connecting the fourth linear solenoid valve SL4 and the hydraulic pressure servo 54 of the fourth clutch C4. The second cutoff valve 47 is provided with a first port 47a to which engaging hydraulic pressure to be supplied from the fourth linear solenoid valve SL4 to the hydraulic pressure servo 54 of the fourth clutch C4 is input, a second port 47b for outputting the engaging hydraulic pressure input to the first port 47a to the hydraulic pressure servo 54 of the fourth clutch C4, a third port 47c to which engaging hydraulic pressure to be supplied from the third linear solenoid valve SL3 to the hydraulic pressure servo 53 of the third clutch C3 is input, and a drain port 47d.

Regarding the operation of the second cutoff valve 47, when the engaging hydraulic pressure to be supplied from the third linear solenoid valve SL3 to the hydraulic pressure servo 53 of the third clutch C3 is input to the third port 47c, the first port 47a is closed so as to interrupt the supply of engaging hydraulic pressure from the fourth linear solenoid valve SL4 to the hydraulic pressure servo 54 of the fourth clutch C4, and the second port 47b and the drain port 47d are brought into communication with each other so as to drain the engaging hydraulic pressure supplied to the hydraulic pressure servo 54 of the fourth clutch C4.

The third cutoff valve 48 is a fail safe valve provided along a hydraulic pressure flow path connecting the fifth linear solenoid valve SL5 and the hydraulic pressure servo 55 of the first brake B1. The third cutoff valve 48 is provided with a first port 48a to which engaging hydraulic pressure to be supplied from the fifth linear solenoid valve SL5 to the hydraulic pressure servo 55 of the first brake B1 is input, a second port 48b for outputting the engaging hydraulic pressure input to the first port 48a to the hydraulic pressure servo 55 of the first brake B1, a third port 48c to which the engaging hydraulic pressure to be supplied from the third linear solenoid valve SL3 to the hydraulic pressure servo 53 of the third clutch C3 is input, a fourth port 48d to which the engaging hydraulic pressure to be supplied from the fourth linear solenoid valve SL4 to the hydraulic pressure servo 54 of the fourth clutch C4 is input, and a drain port 48e.

Regarding the operation of the third cutoff valve 48, when the engaging hydraulic pressure to be supplied from the third linear solenoid valve SL3 to the hydraulic pressure servo 53 of the third clutch C3 is input to the third port 48c, or when the engaging hydraulic pressure to be supplied from the fourth linear solenoid valve SL4 to the hydraulic pressure servo 54 of the fourth clutch C4 is input to the fourth port 48d, the first port 48a is closed so as to interrupt the supply of engaging hydraulic pressure from the fifth linear solenoid valve SL5 to the hydraulic pressure servo 55 of the first brake B1, and the second port 48b and the drain port 48e are brought into communication with each other so as to drain the engaging hydraulic pressure supplied to the hydraulic pressure servo 55 of the first brake B1.

The first switching valve 49 is provided with a first port 49a to which the engaging hydraulic pressure to be supplied from the fourth linear solenoid valve SL4 to the hydraulic pressure servo 54 of the fourth clutch C4 is input, a second port 49b to which the engaging hydraulic pressure to be supplied from the fifth linear solenoid valve SL5 to the hydraulic pressure servo 55 of the first brake B1 is input, and a third port 49c for, when engaging hydraulic pressure is supplied to either the first port 49a or the second port 49b, causing the input engaging hydraulic pressure to be input to a second port 50b of the second switching valve 50.

The second switching valve 50 is provided with a first port 50a to which the engaging hydraulic pressure to be supplied from the third linear solenoid valve SL3 to the hydraulic pressure servo 53 of the third clutch C3 is input, the second port 50b to which the engaging hydraulic pressure output from the third port 49c of the first switching valve 49 is input, and a third port 50c for, when engaging hydraulic pressure is supplied to either the first port 50a or the second port 50b, causing the input engaging hydraulic pressure to be input to the fourth port 46d of the first cutoff valve 46.

The ECT_ECU 6 controls the hydraulic control circuit 4 so as to establish an appropriate gear, or in other words, a power transmission path in the gearshift mechanism unit 3.

Figure 4:
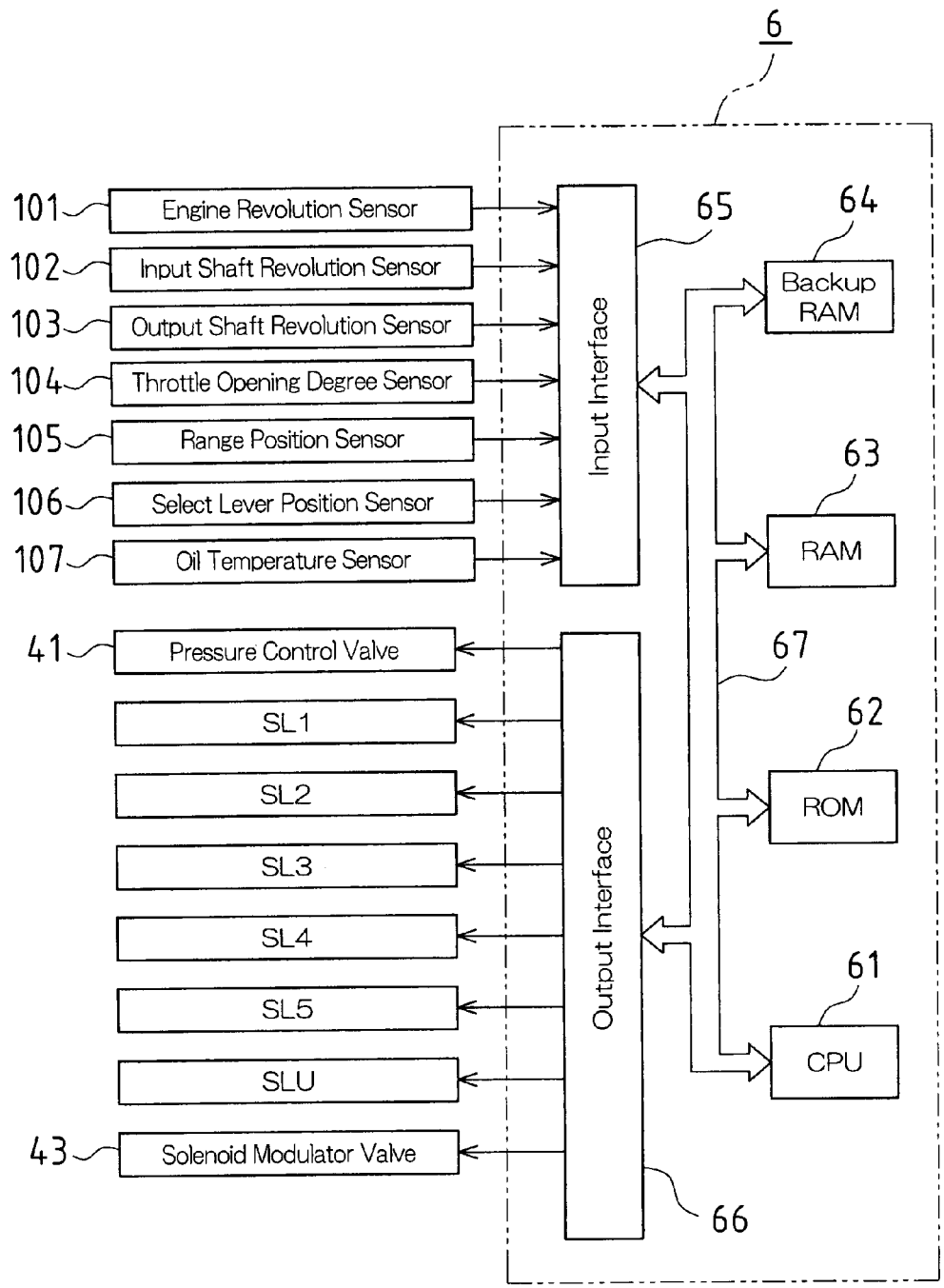
FIG. 4 is a diagram showing the configuration of an automatic transmission control apparatus (ECT_ECU) shown in FIG. 1 and an input/output system thereof.

As shown in FIG. 4, the ECT_ECU 6 has a configuration in which a central processing unit (CPU) 61, a read-only memory (ROM) 62, a random access memory (RAM) 63, a backup RAM 64, an input interface 65 and an output interface 66 are connected to each other by a bidirectional bus 67.

The ENG_ECU 8 also has the same hardware configuration as the ECT_ECU 6.

The CPU 61 executes computation processing based on various control programs and control maps stored in the ROM 62. The ROM 62 stores various control programs for controlling a gearshift operation of the gearshift mechanism unit 3 and an appropriate fail safe operation. The fail safe operation will be described later in detail. The RAM 63 is a memory that temporarily stores results of computation performed by the CPU 61, data input from various sensors, and the like. The backup RAM 64 is a nonvolatile memory that stores various types of data that need to be stored.

The input interface 65 is connected to at least an engine revolution sensor 101, an input shaft revolution sensor 102, an output shaft revolution sensor 103, a throttle opening degree sensor 104, a range position sensor 105, a select lever position sensor 106, an oil temperature sensor 107, and the like. Likewise, the output interface 66 is connected to at least appropriate constituent elements of the hydraulic control circuit 4 (the pressure control valve 41, the solenoid modulator valve 43, the linear solenoid valve SLU and the linear solenoid valves SL1, SL2, SL3, SL4 and SL5).

The engine revolution sensor 101 detects the number of rotations (engine revolution number NE) of the torque converter 2 to which the rotation of the internal combustion engine 7 is transmitted. The input shaft revolution sensor 102 detects the number of rotations NT of the input shaft 9. The output shaft revolution sensor 103 detects the number of rotations NO of the output shaft 10. The throttle opening degree sensor 104 detects the amount of accelerator pedal depression.

The range position sensor 105 outputs a signal corresponding to the oil path position (P, R, N or D) of the manual valve 42. Upon receiving the signal, the ECT_ECU 6 identifies the actual gear stage. The range position sensor 105 can be, for example, a known sensor called a neutral start switch. Usually, the neutral start switch is used in the following case. When activation of the internal combustion engine 7 is requested and the ECT_ECU 6 determines based on the output from the neutral start switch that the transmission is in the neutral range N, activation of the internal combustion engine 7 is permitted. Specifically, the neutral start switch detects the rotation angle of a manual shaft 15a of the range switching mechanism 13, which will be described later. The rotation angle has a correlation with the position (P, R, N or D) of the manual valve 42 that works in cooperation with a detent plate 15, and therefore the position of (P, R, N or D) of the manual valve 42 can be detected by detecting the rotation angle.

The select lever position sensor 106 outputs a signal corresponding to the target range selected by an operation of the select lever 11. Upon receiving the signal, the ECT_ECU 6 identifies the target range. The oil temperature sensor 107 outputs a signal corresponding to the temperature of oil (ATF: automatic fluid) in the hydraulic control circuit 4 of the automatic transmission 1.

Regarding a gearshift operation by the ECT_ECU 6, for example, when the select lever 11 or the parking switch 12 is manually operated by the driver, the shift-by-wire range switching mechanism 13 is caused to actuate the manual valve 42 of the hydraulic control circuit 4, with the range (P, R, N or D) selected by this operation being set as the target, whereby the target gear stage of the gearshift mechanism unit 3 is established.

Figure 5:
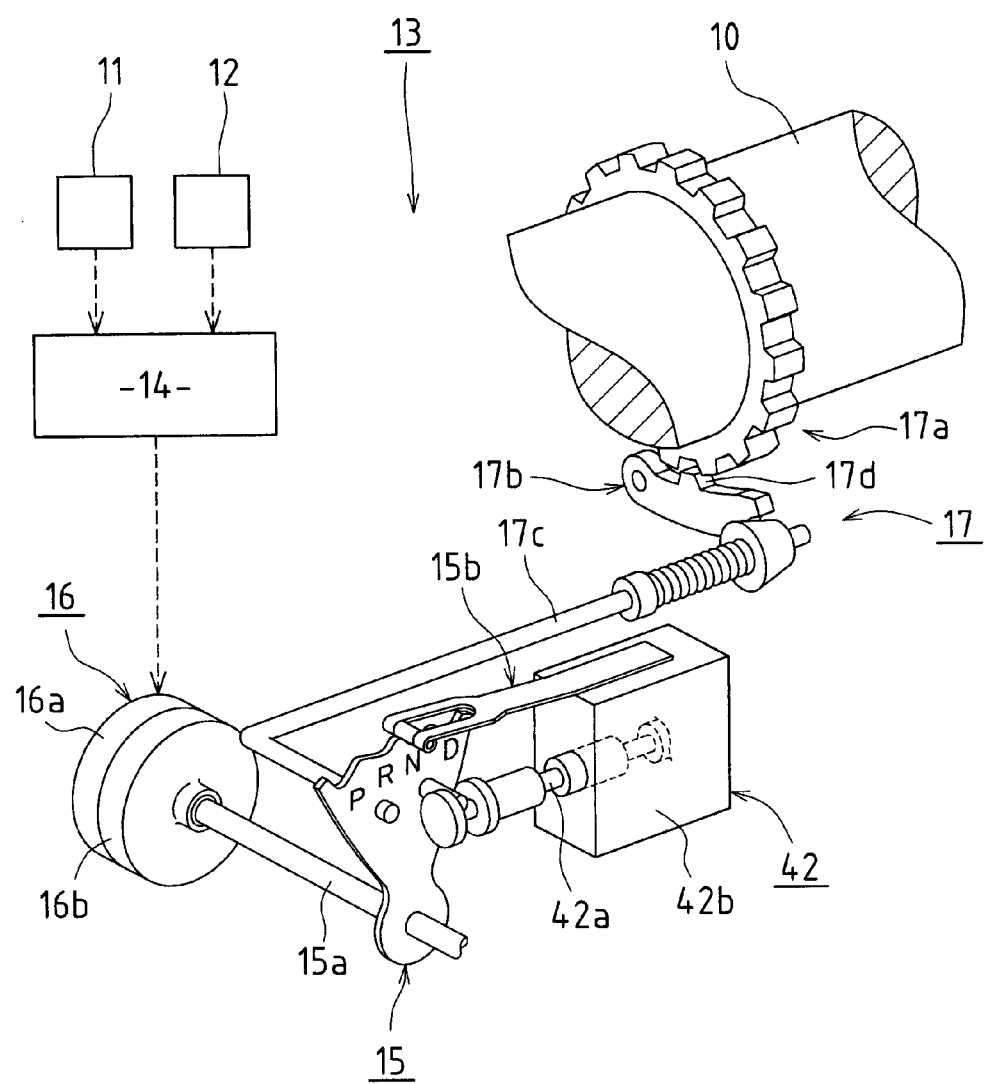
FIG. 5 is a diagram showing the schematic configuration of a range switching mechanism shown in FIG. 1.

As shown in FIG. 5, the range switching mechanism 13 primarily includes a SBW (Shift by Wire)_ECU 14, the detent plate 15, an actuator 16, and a parking mechanism 17.

The SBW_ECU 14 controls the operation of the actuator 16, and includes, although not shown in the drawing, a CPU, a ROM, a RAM, a backup RAM and the like, as with commonly used ECUs. The SBW_ECU 14 is connected to the ECT_ECU 6 so as to be capable of bidirectional transmission and reception of necessary information between each other. The ECT_ECU 6 and the SBW_ECU 14 execute gearshift processing for switching the automatic transmission 1 to the requested gear stage, as necessary.

The detent plate 15 is tilted by the actuator 16, whereby the spool valve 42a of the manual valve 42 and a parking rod 17c of the parking mechanism 17 are pushed or pulled stepwise and positioned. A detent mechanism is configured including the detent plate 15, the manual shaft 15a and a detent spring 15b.

The detent plate 15 has a fan-like outer shape, and the manual shaft 15a serving as the tilting (rotation) support shaft is integrally fixed to a region of the detent plate 15 that serves as the center of tilting (rotation). By the manual shaft 15a being driven for rotation by the actuator 16, the detent plate 15 is tilted (rotated).

The actuator 16 includes, although not shown in detail in the drawing, an electric motor 16a serving as a rotational power generation unit and a speed reduction mechanism 16b. An output shaft (not shown) of the speed reduction mechanism 16b is coupled to the manual shaft 15a so as to be capable of integral rotation by, for example, spline fitting.

The parking mechanism 17 switches the output shaft 10 of the automatic transmission 1 between a locked state in which rotation is not possible and an unlocked state in which rotation is possible, and primarily includes a parking gear 17a, a parking lock pole 17b and the parking rod 17c.

The basic operation of the range switching mechanism 13 will be described below.

When any of parking range (P), reverse range (R), neutral range (N), drive range (D) and the like of the automatic transmission 1 has been selected by the driver manually operating the select lever 11 or the parking switch 12, the SBW_ECU 14 identifies the selected target range based on the output from the select lever 11 or the parking switch 12, and causes the output shaft of the actuator 16 to be forward or reverse rotated by a predetermined angle.

The detent plate 15 is rotated (tilted) as appropriate by the manual shaft 15a that integrally rotates with the output shaft of the actuator 16. As a result of the detent plate 15 being tilted, the spool valve 42a of the manual valve 42 is axially slid, and the manual valve 42 is switched to one of "P", "R", "N" and "D" that has been selected as the target range. When the detent plate 15 stops, a roller of the detent spring 15b is fitted into a trough of a waveform portion of the detent plate 15, and thereby positioned and held in that position. The detent spring 15b is supported by a valve body 42b of the manual valve 42, or the like.

The SBW_ECU 14 sets a target rotation angle (target pulse count value) that corresponds to the selected target range, then starts energizing the motor 16a, detects the rotor rotation angle of the motor 16a with a rotor angle detection means, and feedback controls the motor 16a to stop at a position at which the detected value matches the target rotation angle.

When parking range P has been selected by the driver manually operating the parking switch 12, the detent plate 15 is tilted by a predetermined angle. As a result of the tilt, the parking rod 17c is pushed and the parking lock pole 17b is raised, whereby a claw 17d of the parking lock pole 17b is received in a gap between teeth of the parking gear 17a that is externally fixed to the output shaft 10 of the automatic transmission 1 so as to be capable of integral rotation. Consequently, the output shaft 10 of the automatic transmission 1 is brought into a non-rotational state, and the spool valve 42a of the manual valve 42 stops at "P" position, whereby all of the clutches C1 to C4 and the brakes B1 and B2 are disengaged.

Next, conditions for establishing respective gear stages in the gearshift mechanism unit 3 discussed above will be described in detail with reference to FIG. 6.

FIG. 6 is an engagement table that shows a relationship between each gear stage and an engaged or disengaged state of the first to fourth clutches C1 to C4, the first and second brakes B1 and B2 and the one-way clutch F1. In this engagement table, a circle indicates an "engaged state", a cross indicates a "disengaged state", a double circle indicates an "engaged state during engine brake", and a triangle indicates an "engaged state only during driving".

First Gear Stage: 1st

The first (1st) gear stage is established by engagement of the first clutch C1 and automatic engagement of the one-way clutch F1. In the first (1st) gear stage, the first clutch C1 is engaged by securing only an engaging hydraulic pressure supply path from the first linear solenoid valve SL1 to the first clutch C1.

In this case, the engagement of the first clutch C1 causes the first ring gear R1 of the front planetary gear unit 31 and the third sun gear S3 of the rear planetary gear unit 32 to be capable of integral rotation, and automatic engagement of the one-way clutch F1 causes the second carrier CA2 of the rear planetary gear unit 32 to stop rotating.

Consequently, the third sun gear S3 rotated from the first carrier CA1 directly connected to the input shaft 9 via the first ring gear R1, the second carrier CA2 whose reverse rotation is blocked by the one-way clutch F1, and the second sun gear S2 that is capable of free rotation are engaged, whereby the second ring gear R2 and the output shaft 10 are rotated at the gear ratio for the first gear stage.

Second Gear Stage: 2nd

The second (2nd) gear stage is established by engagement of the first clutch C1 and the first brake B1. In the second (2nd) gear stage, the first clutch C1 is engaged by securing the engaging hydraulic pressure supply path from the first linear solenoid valve SL1 to the first clutch C1, and the first brake B1 is engaged by securing an engaging hydraulic pressure supply path from the fifth linear solenoid valve SL5 to the first brake B1.

In this case, first, the engagement of the first clutch C1 causes the first ring gear R1 of the front planetary gear unit 31 and the third sun gear S3 of the rear planetary gear unit 32 to be capable of integral rotation, and the engagement of the first brake B1 causes the intermediate drum 33 and the second sun gear S2 of the rear planetary gear unit 32 to be fixed to the case 1a and become incapable of rotation.

Consequently, the third sun gear S3 rotated from the first carrier CA1 directly connected to the input shaft 9 via the first ring gear R1, the second sun gear S2 that is made non-rotatable, and the second carrier CA2 that is capable of free rotation are engaged, whereby the second ring gear R2 and the output shaft 10 are rotated at the gear ratio for the second gear stage.

Third Gear Stage: 3rd

The third (3rd) gear stage is established by engagement of the first clutch C1 and the third clutch C3. In the third (3rd) gear stage, the first clutch C1 is engaged by securing the engaging hydraulic pressure supply path from the first linear solenoid valve SL1 to the first clutch C1, and the third clutch C3 is engaged by securing an engaging hydraulic pressure supply path from the third linear solenoid valve SL3 to the third clutch C3.

In this case, first, the engagement of the first clutch C1 causes the first ring gear R1 of the front planetary gear unit 31 and the third sun gear S3 of the rear planetary gear unit 32 to be capable of integral rotation, and the engagement of the third clutch C3 causes the first ring gear R1 of the front planetary gear unit 31, the intermediate drum 33, and the second sun gear S2 of the rear planetary gear unit 32 to be capable of integral rotation.

Consequently, the second sun gear S2 and the third sun gear S3 that are rotated from the first carrier CA1 directly connected to the input shaft 9 via the first ring gear R1 and the intermediate drum 33, and the second carrier CA2 that is capable of free rotation are engaged, whereby the second ring gear R2 and the output shaft 10 are rotated at the gear ratio for the third gear stage.

Fourth Gear Stage: 4th

The fourth (4th) gear stage is established by engagement of the first clutch C1 and the fourth clutch C4. In the fourth (4th) gear stage, the first clutch C1 is engaged by securing the engaging hydraulic pressure supply path from the first linear solenoid valve SL1 to the first clutch C1, and the fourth clutch C4 is engaged by securing an engaging hydraulic pressure supply path from the fourth linear solenoid valve SL4 to the fourth clutch C4.

In this case, first, the engagement of the first clutch C1 causes the first ring gear R1 of the front planetary gear unit 31 and the third sun gear S3 of the rear planetary gear unit 32 to be capable of integral rotation, and the engagement of the fourth clutch C4 causes the first carrier CA1 of the front planetary gear unit 31, the intermediate drum 33, and the second sun gear S2 of the rear planetary gear unit 32 to be capable of integral rotation.

Consequently, the second sun gear S2 rotated via the first carrier CA1 directly connected to the input shaft 9 and the intermediate drum 33, the third sun gear S3 rotated from the first carrier CA1 directly connected to the input shaft 9 via the first ring gear R1, and the second carrier CA2 that is capable of free rotation are engaged, whereby the second ring gear R2 and the output shaft 10 are rotated at the gear ratio for the fourth gear stage.

Fifth Gear Stage: 5th

The fifth (5th) gear stage is established by engagement of the first clutch C1 and the second clutch C2. In the fifth (5th) gear stage, the first clutch C1 is engaged by securing the engaging hydraulic pressure supply path from the first linear solenoid valve SL1 to the first clutch C1, and the second clutch C2 is engaged by securing an engaging hydraulic pressure supply path from the second linear solenoid valve SL2 to the second clutch C2.

In this case, first, the engagement of the first clutch C1 causes the first ring gear R1 of the front planetary gear unit 31 and the third sun gear S3 of the rear planetary gear unit 32 to be capable of integral rotation, and the engagement of the second clutch C2 causes the input shaft 9 and the second carrier CA2 of the rear planetary gear unit 32 to be capable of integral rotation.

Consequently, the third sun gear S3 rotated from the first carrier CA1 directly connected to the input shaft 9 via the first ring gear R1, the second sun gear S2 that is capable of free rotation, and the second carrier CA2 that integrally rotates with the input shaft 9 are engaged, whereby the second ring gear R2 and the output shaft 10 are rotated at the gear ratio for the fifth gear stage.

Sixth Gear Stage: 6th

The sixth (6th) gear stage is established by engagement of the second clutch C2 and the fourth clutch C4. In the sixth (6th) gear stage, the second clutch C2 is engaged by securing the engaging hydraulic pressure supply path from the second linear solenoid valve SL2 to the second clutch C2, and the fourth clutch C4 is engaged by securing the engaging hydraulic pressure supply path from the fourth linear solenoid valve SL4 to the fourth clutch C4.

In this case, first, the engagement of the second clutch C2 causes the input shaft 9 and the second carrier CA2 of the rear planetary gear unit 32 to be capable of integral rotation, and the engagement of the fourth clutch C4 causes the first carrier CA1 of the front planetary gear unit 31, the intermediate drum 33 and the second sun gear S2 of the rear planetary gear unit 32 to be capable of integral rotation.

Consequently, the second sun gear S2 rotated via the first carrier CA1 directly connected to the input shaft 9 and the intermediate drum 33, the second carrier CA2 that integrally rotates with the input shaft 9, and the third sun gear S3 that is capable of free rotation are engaged, whereby the second ring gear R2 and the output shaft 10 are rotated at the gear ratio for the sixth gear stage.

Seventh Gear Stage: 7th

The seventh (7th) gear stage is established by engagement of the second clutch C2 and the third clutch C3. In the seventh (7th) gear stage, the second clutch C2 is engaged by securing the engaging hydraulic pressure supply path from the second linear solenoid valve SL2 to the second clutch C2, and the third clutch C3 is engaged by securing the engaging hydraulic pressure supply path from the third linear solenoid valve SL3 to the third clutch C3.

In this case, first, the engagement of the second clutch C2 causes the input shaft 9 and the second carrier CA2 of the rear planetary gear unit 32 to be capable of integral rotation, and the engagement of the third clutch C3 causes the first ring gear R1 of the front planetary gear unit 31, the intermediate drum 33 and the second sun gear S2 of the rear planetary gear unit 32 to be capable of integral rotation.

Consequently, the second sun gear S2 rotated from the first carrier CA1 directly connected to the input shaft 9 via the first ring gear R1 and the intermediate drum 33, the second carrier CA2 that is integrally rotated with the input shaft 9, and the third sun gear S3 that rotates freely are engaged, whereby the second ring gear R2 and the output shaft 10 are rotated at the gear ratio for the seventh gear stage.

Eighth Gear Stage: 8th

The eighth (8th) gear stage is established by engagement of the second clutch C2 and the first brake B1. In the eighth (8th) gear stage, the second clutch C2 is engaged by securing the engaging hydraulic pressure supply path from the second linear solenoid valve SL2 to the second clutch C2, and the first brake B1 is engaged by securing the engaging hydraulic pressure supply path from the fifth linear solenoid valve SL5 to the first brake B1.

In this case, first, the engagement of the second clutch C2 causes the input shaft 9 and the second carrier CA2 of the rear planetary gear unit 32 to be capable of integral rotation, and the engagement of the first brake B1 causes the intermediate drum 33 and the second sun gear S2 of the rear planetary gear unit 32 to be fixed to the case 1a and become incapable of rotation.

Consequently, the second carrier CA2 that is integrally rotated with the input shaft 9, the intermediate drum 33 and the second sun gear S2 that are made non-rotatable, and the third sun gear S3 that rotates freely are engaged, whereby the second ring gear R2 and the output shaft 10 are rotated at the gear ratio for the eighth gear stage.

Reverse Gear Stage: Rev

The reverse (Rev) gear stage is established by engagement of the fourth clutch C4 and the second brake B2. In the reverse (Rev) gear stage, the fourth clutch C4 is engaged by securing the engaging hydraulic pressure supply path from the fourth linear solenoid valve SL4 to the fourth clutch C4, and the second brake B2 is engaged by securing an engaging hydraulic pressure supply path from the manual valve 42 to the second brake B2.

In this case, first, the engagement of the fourth clutch C4 causes the first carrier CA1 of the front planetary gear unit 31, the intermediate drum 33 and the second sun gear S2 of the rear planetary gear unit 32 to be capable of integral rotation, and the engagement of the second brake B2 causes the second carrier CA2 of the rear planetary gear unit 32 to be fixed to the case 1a and become incapable of rotation.

Consequently, the second sun gear S2 rotated via the first carrier CA1 directly connected to the input shaft 9 and the intermediate drum 33, the second carrier CA2 that is made non-rotatable, and the third sun gear S3 that rotates freely are engaged, whereby the second ring gear R2 and the output shaft 10 are reverse rotated at the gear ratio for the second reverse gear stage.

In the parking range P and the neutral range N, all of the first to fourth clutches C1 to C4 and the first and second brakes B1 and B2 are disengaged. Consequently, transmission of power from the input shaft 9 to the output shaft 10 is interrupted, and transmission of driving power from the automatic transmission 1 to the driving wheels is interrupted.

Parts to which features of the present invention have been applied will be described next in detail with reference to FIGS. 7 to 13.

If, for example, an unintentional operational failure or the like in the actuator 16 of the range switching mechanism 13 or the manual valve 42 causes a switching anomaly in which the target range (target gear stage) selected by the driver operating the select lever 11 and the actually established gear stage (actual gear stage) in the automatic transmission 1 do not match, it is necessary to take measures to disengage the frictional engagement elements (the first to fourth clutches C1 to C4 and the first and second brakes B1 and B2) that are establishing the actual gear stage.

To this end, the present embodiment uses a configuration in which, in the case of switching to the reverse (Rev) gear stage from a state in which the first (1st) forward gear stage has been established, or in the case of switching to the first (1st) forward gear stage from a state in which the reverse (Rev) gear stage has been established, if a switching anomaly as described above occurs, supply of engaging hydraulic pressure to the frictional engagement elements (the first to fourth clutches C1 to C4 and the first and second brakes B1 and B2) is stopped, and the engaging hydraulic pressure is drained into the case 1a of the automatic transmission 1 from an anomaly drain path that is shorter than a normal drain path used during normal operation.

Figure 7:
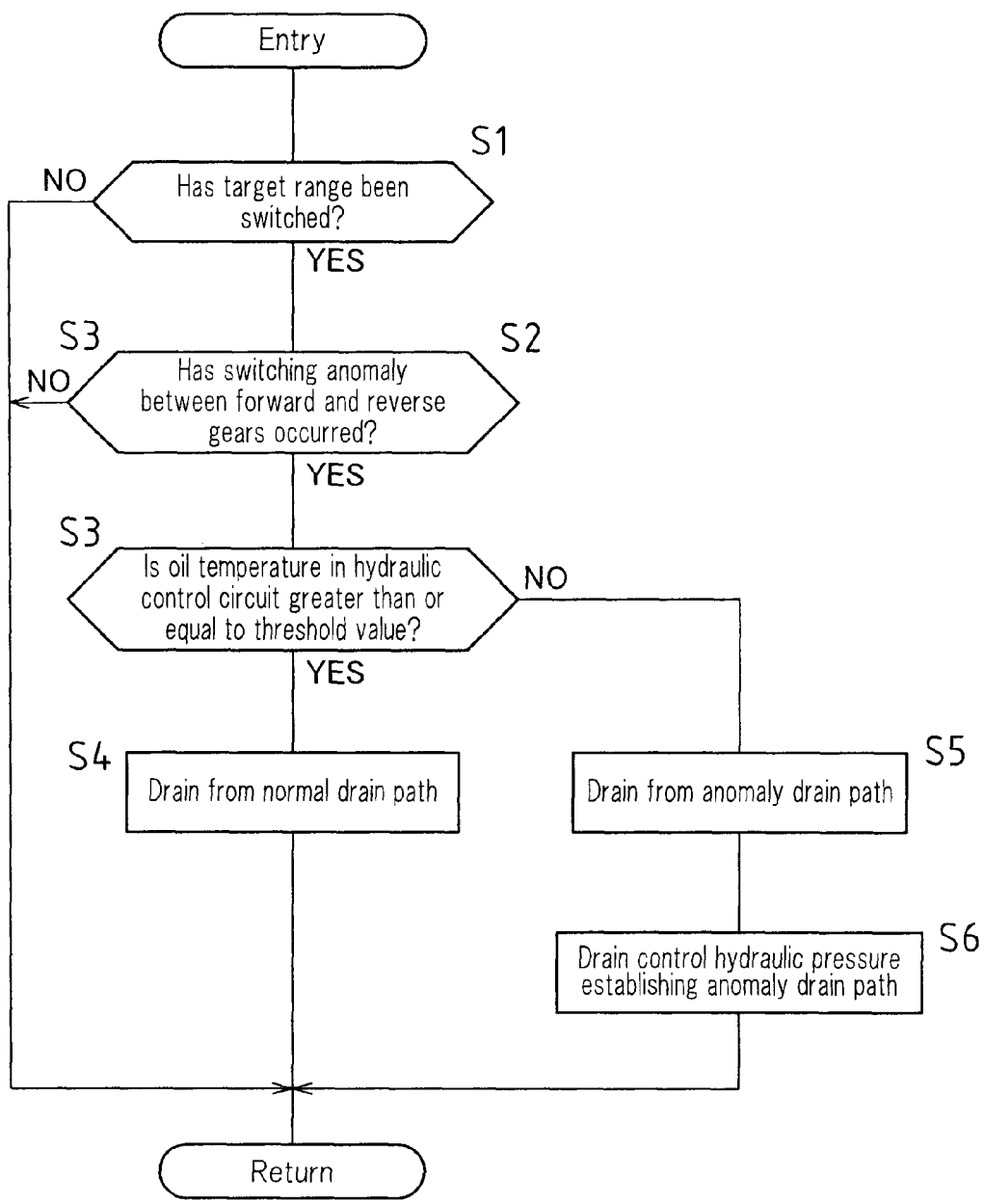
FIG. 7 is a flowchart illustrating an example of control performed by the automatic transmission control apparatus (ECT_ECU) shown in FIG. 4.

Specifically, a control operation performed by the ECT_ECU 6 will be described with reference to the flowchart shown in FIG. 7. The flowchart shown in FIG. 7 is executed at a regular interval (for example, approximately every several milliseconds to several tens of milliseconds) during vehicle travel.

First, upon entering step S1, it is determined whether or not an operation of the select lever 11 by the driver has been received, or in other words, whether or not the target range has been switched. Here, the determination is made based on the output from the select lever position sensor 106.

If, as a result, it is determined that an operation of the select lever 11 has not been received, No is determined in step S1, and processing of the flowchart ends. If, on the other hand, it is determined that an operation of the select lever 11 has been received, Yes is determined in step S1, and the procedure advances to the next step S2.

In step S2, it is determined whether or not a switching anomaly between forward and reverse gears has occurred. Here, it is checked whether or not the actual gear stage remains in the reverse gear stage (or the first forward gear stage) due to an unintentional operational failure in the actuator 16 (the motor 16a) of the range switching mechanism 13 or the manual valve 42, despite the fact that the target range has been set to the first forward gear stage (or the reverse gear stage). The target range can be identified based on the output from the select lever position sensor 106, and the actual gear stage can be identified based on the output from the range position sensor 105.

If, as a result, it is determined that a switching anomaly has not occurred, or in other words, it is determined that the target range and the actual gear stage match, No is determined in step S2, and processing of the flowchart ends. If, on the other hand, it is determined that a switching anomaly has occurred, or in other words, it is determined that the target range and the actual gear stage do not match, Yes is determined in step S2, and the procedure advances to the next step S3.

In step S3, it is determined, based on the output from the oil temperature sensor 107, whether or not the oil temperature (ATF temperature) in the hydraulic control circuit 4 is greater than or equal to a predetermined threshold value. The threshold value is preferably set according to, for example, the viscosity of oil in the hydraulic control circuit 4. The viscosity of oil, however, varies depending on the environment, season and the operational status of the automatic transmission 1, and the like, and thus the threshold value can be empirically set by obtaining, through experimentation, a relationship between oil temperature and oil flow condition in the hydraulic control circuit 4.

If, as a result, it is determined that the oil temperature is greater than or equal to the predetermined threshold value, Yes is determined in step S3, and then in step S4, a normal drain path (81, 82 or 83) is secured, and the engaging hydraulic pressure supplied to the relevant frictional engagement elements (the first to fourth clutches C1 to C4, the first and second brakes B1 and B2) is drained from the normal drain path (81, 82 or 83).

If, on the other hand, it is determined that the oil temperature is less than the threshold value, No is determined in step S3, and the procedure advances to step S5. In step S5, an anomaly drain path (91 or 92) is secured, and the engaging hydraulic pressure supplied to the relevant frictional engagement elements (the first to fourth clutches C1 to C4, the first and second brakes B1 and B2) is drained from the anomaly drain path (91 or 92).

After that, in the next step S6, the control hydraulic pressure supplied to a valve (the first cutoff valve 46 or the B2 control valve 44) establishing the anomaly drain path (91 or 92) secured in step S5 is drained, and processing of the flowchart ends.

Figure 8:
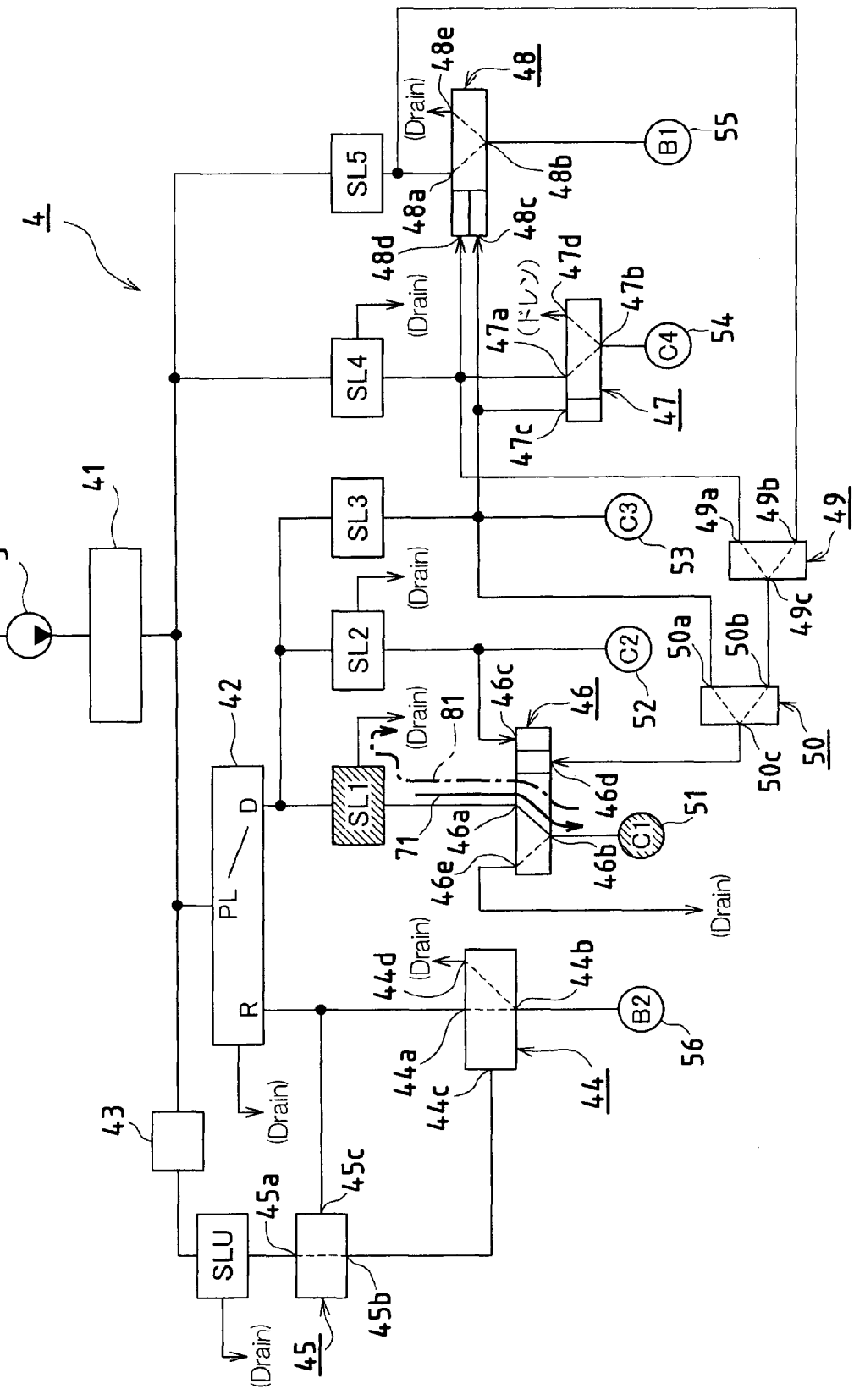
FIG. 8 is a diagram, corresponding to FIG. 3, that shows hydraulic pressure paths for establishing a first forward gear stage.
Figure 9:
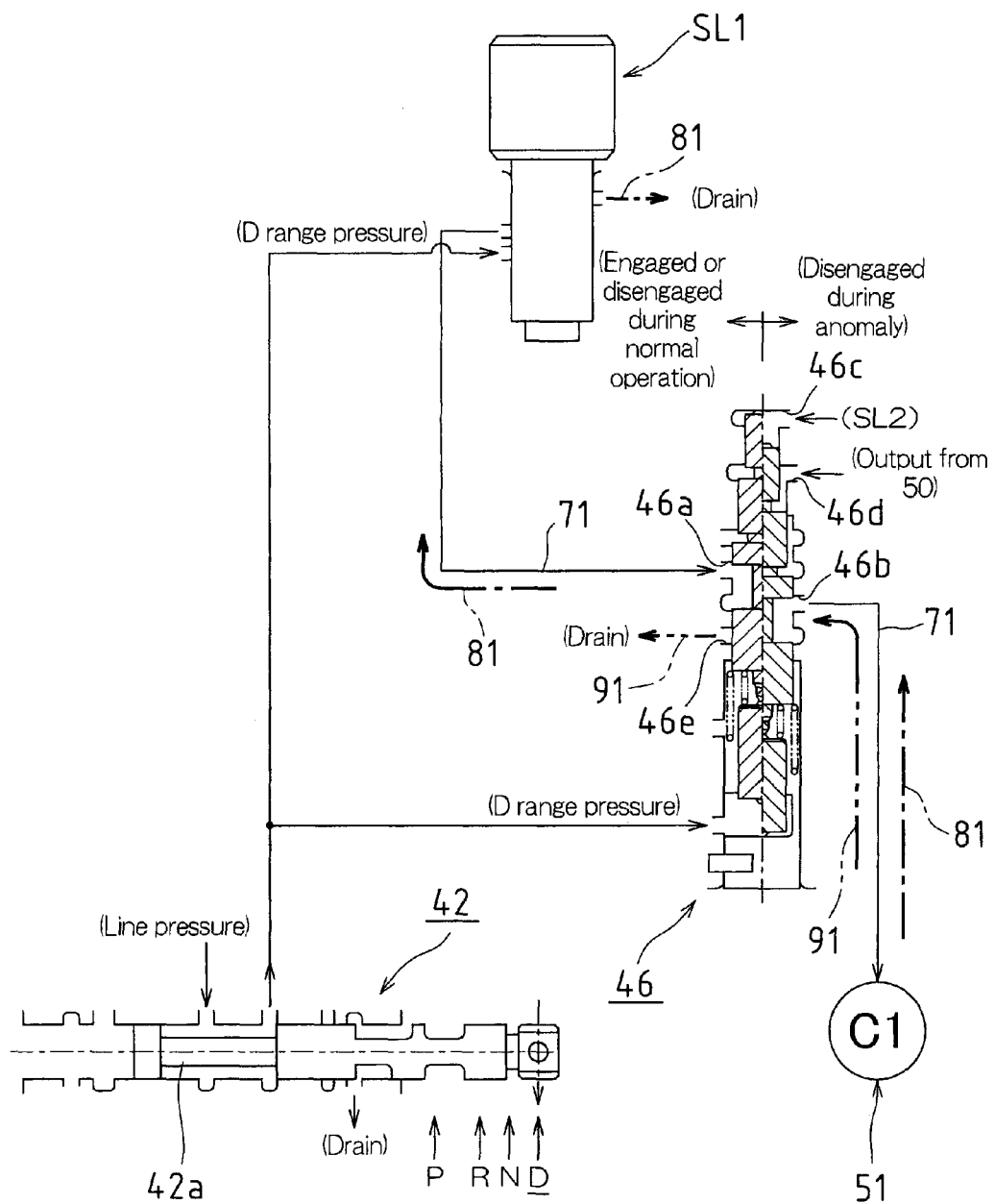
FIG. 9 is a diagram showing the detailed configuration of some of the valves shown in FIG. 8.
Figure 10:
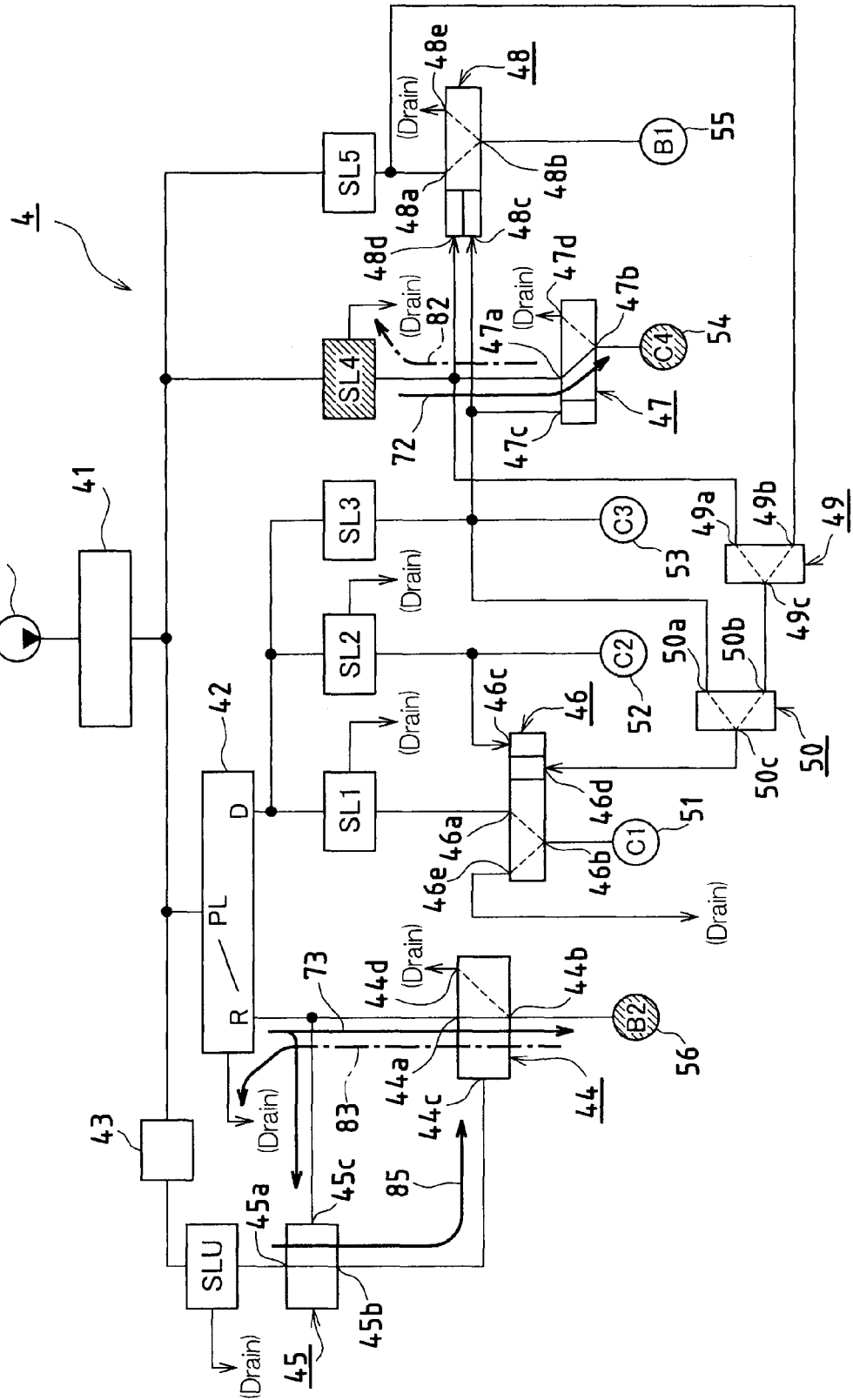
FIG. 10 is a diagram, corresponding to FIG. 3, that shows hydraulic pressure paths for establishing a reverse gear stage.

Next is a detailed description of the processing of step S4 described above, or in other words, processing for securing a normal drain path used when range switching is normally performed, with reference to FIGS. 8 to 10. In FIGS. 8 to 10, hatching has been added to the linear solenoid valves and the hydraulic pressure servos that are to be actuated according to respective gear stages.

(1) First, as described earlier, the first (1st) forward gear stage is established by engagement of the first clutch C1 and automatic engagement of the one-way clutch F1, which is shown in the engagement table of FIG. 6. Accordingly, as indicated by a solid arrow 71 in FIGS. 8 and 9, engaging hydraulic pressure is supplied to the hydraulic pressure servo 51 of the first clutch C1 via a drive port D of the manual valve 42, the first linear solenoid valve SL1 and the first cutoff valve 46.

In the case of switching to the reverse (Rev) gear stage from a state in which the first (1st) forward gear stage has been established as described above, the fourth clutch C4 and the second brake B2 are engaged at the same time when the first clutch C1 is disengaged. Such switching is called clutch-to-clutch shift.

At this time, when normal switching is possible, the first clutch C1 is disengaged by draining the engaging hydraulic pressure supplied to the hydraulic pressure servo 51 of the currently engaged first clutch C1.

Specifically, the ECT_ECU 6 closes a range pressure input port and opens a drain port of the first linear solenoid valve SL1, thereby causing the engaging hydraulic pressure supplied to the hydraulic pressure servo 51 of the first clutch C1 to flow in the reverse direction to the engaging hydraulic pressure supply path (see the solid arrow 71 in FIGS. 8 and 9), as indicated by a dot-dash arrow 81 in FIGS. 8 and 9, and drain from the drain port of the first linear solenoid valve SL1. The reverse path to the engaging hydraulic pressure supply path 71 is denoted as normal drain path 81 for disengagement of the first clutch C1.

(2) Next, as described earlier, the reverse (Rev) gear stage is established by engagement of the fourth clutch C4 and the engagement of the second brake B2, which is shown in the engagement table of FIG. 6. Accordingly, as indicated by a solid arrow 72 in FIGS. 10 and 11, the line pressure output from the pressure control valve 41 is supplied, as engaging hydraulic pressure, to the hydraulic pressure servo 54 of the fourth clutch C4 via the fourth linear solenoid valve SL4 and the second cutoff valve 47 (a communication path between the first port 47a and the second port 47b), and at the same time, as indicated by a solid arrow 73 in FIGS. 10 and 11, the engaging hydraulic pressure (R range pressure) output from the output port R of the manual valve 42 is supplied to the hydraulic pressure servo 56 of the second brake B2 via the B2 control valve 44 (a communication path between the first port 44a and the second port 44b).

In the case of switching to the first (1st) gear stage from a state in which the reverse (Rev) gear stage has been established as described above, the first clutch C1 is engaged at the same time when the fourth clutch C4 and the second brake B2 are disengaged.

At this time, when normal switching is possible, the fourth clutch C4 is disengaged by causing the engaging hydraulic pressure supplied to the hydraulic pressure servo 54 of the currently engaged fourth clutch C4 to drain, and the second brake B2 is disengaged by causing the engaging hydraulic pressure supplied to the hydraulic pressure servo 56 of the currently engaged second brake B2 to drain. This processing is performed as follows in the present embodiment.

Figure 11:
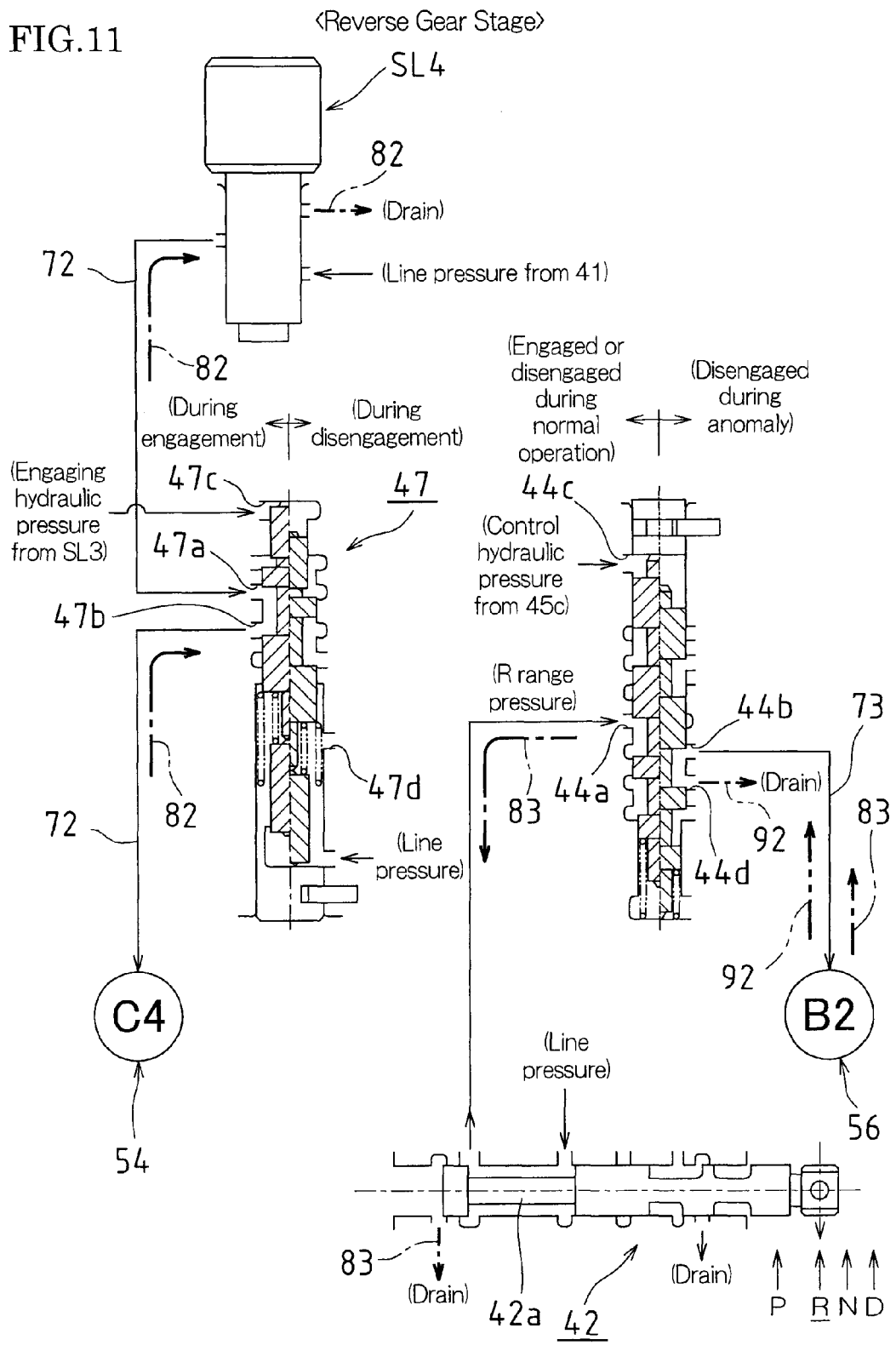
FIG. 11 is a diagram showing the detailed configuration of some of the valves shown in FIG. 10.

First, the ECT_ECU 6 closes a line pressure input port and opens a drain port of the fourth linear solenoid valve SL4, thereby causing the engaging hydraulic pressure supplied to the hydraulic pressure servo 54 of the fourth clutch C4 to flow in the reverse direction to the engaging hydraulic pressure supply path (see the solid arrow 72 in FIGS. 10 and 11), as indicated by a dot-dash arrow 82 in FIGS. 10 and 11, and drain from the drain port of the fourth linear solenoid valve SL4. The reverse path of the engaging hydraulic pressure is denoted as normal drain path 82 for disengagement of the fourth clutch C4.

Meanwhile, the spool valve 42a of the manual valve 42 is shifted to open its drain port, thereby causing the engaging hydraulic pressure supplied to the hydraulic pressure servo 56 of the currently engaged second brake B2 to flow in the reverse direction to the engaging hydraulic pressure supply path (see the solid arrow 73 in FIGS. 10 and 11), as indicated by a dot-dash arrow 83 in FIGS. 10 and 11, and drain from the drain port of the manual valve 42. The reverse path of the engaging hydraulic pressure is denoted as normal drain path 83 for disengagement of the second brake B2.

Figure 12:
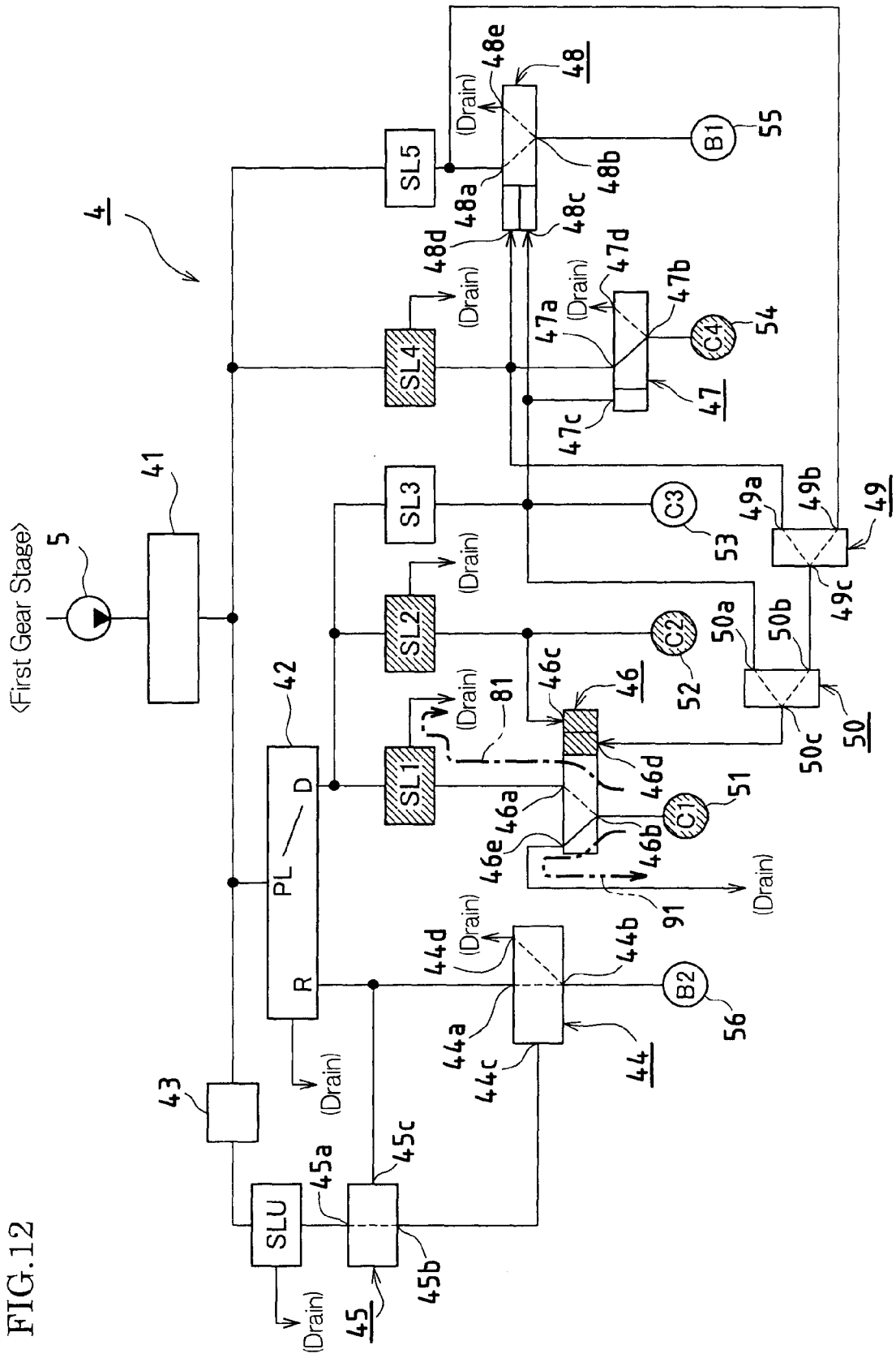
FIG. 12 is a diagram showing anomaly drain paths that are secured when a switching anomaly has occurred in which switching from the first forward gear stage shown in FIG. 8 to the reverse gear stage is not possible.
Figure 13:
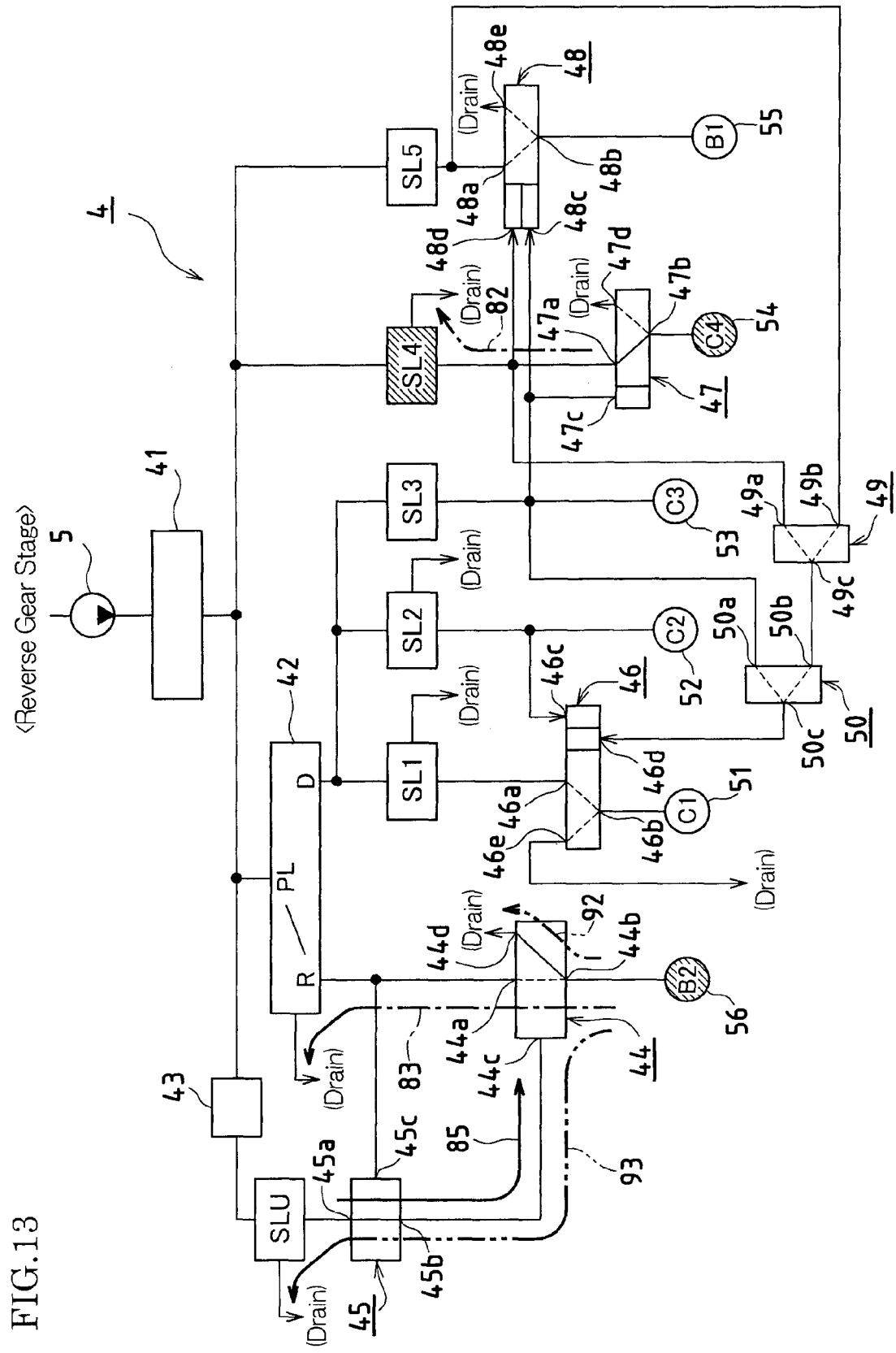
FIG. 13 is a diagram showing anomaly drain paths that are secured when a switching anomaly has occurred in which switching from the reverse gear stage shown in FIG. 10 to the first forward gear stage is not possible.

Next is a detailed description of the processing of step S5 described above, or in other words, processing for securing an anomaly drain path used when a switching anomaly has occurred, with reference to FIGS. 9, 11, 12 and 13. In FIGS. 12 and 13, hatching has been added to the linear solenoid valves and the hydraulic pressure servos that are to be actuated according to respective gear stages.

(3) In the case of the occurrence of a switching anomaly in which switching from the first (1st) forward gear stage to the reverse (Rev) gear stage is not possible, or in other words, in the case where the first (1st) forward gear stage remains established despite the fact that the driver has selected the reverse travel range, it is necessary to disengage the currently engaged first clutch C1.

To this end, the engaging hydraulic pressure supplied to the hydraulic pressure servo 51 of the first clutch C1 is caused to drain from the drain port 46e of the first cutoff valve 46, as indicated by a double dot-dash arrow 91 in FIGS. 9 and 12. The path from the hydraulic pressure servo 51 of the first clutch C1 to the drain port 46*e* of the first cutoff valve 46 is denoted as anomaly drain path 91 for disengagement of the first clutch C1.

The anomaly drain path 91 for disengagement of the first clutch C1 is much shorter than the above-described normal drain path 81. Accordingly, the time required for draining, or in other words, the time required to disengage the first clutch C1 can be shortened significantly, as a result of which transmission of power from the input shaft 9 to the output shaft 10, or in other words, transmission of forward driving power from the automatic transmission 1 to the driving wheels can be interrupted as quickly as possible.

The processing for securing the anomaly drain path 91 will be described in further detail. In the present embodiment, the drain port 46*e* of the first cutoff valve 46 for prevention of tie-up is caused to open by establishing the sixth (6th) forward gear stage while the first (1st) forward gear stage remains established.

Specifically, engaging hydraulic pressure is supplied from the second linear solenoid valve SL2 to the hydraulic pressure servo 52 of the second clutch C2 so as to supply hydraulic pressure equivalent to the engaging hydraulic pressure to the third port 46*c* of the first cutoff valve 46 as well, and also engaging hydraulic pressure is supplied from the fourth linear solenoid valve SL4 to the hydraulic pressure servo 54 of the fourth clutch C4 so as to supply hydraulic pressure equivalent to the engaging hydraulic pressure to the fourth port 46*d* of the first cutoff valve 46 as well via the first and second switching valves 49 and 50.

When the engaging hydraulic pressure is input to the third port 46*c* and the fourth port 46*d* of the first cutoff valve 46 in the manner described above, the drain port 46*e* of the first cutoff valve 46 is opened, and the anomaly drain path 91 indicated by a double dot-dash line in FIGS. 9 and 12 is secured. That is, when the second clutch C2 and the fourth clutch C4 are engaged while the first clutch C1 is being engaged, a tie-up state occurs temporarily in which the three elements are engaged, and thus the drain port 46*e* of the first cutoff valve 46 is opened.

This causes the engaging hydraulic pressure supplied to the hydraulic pressure servo 51 of the first clutch C1 to drain from the drain port 46*e* of the first cutoff valve 46 constituting the anomaly drain path 91, and the first clutch C1 is disengaged. As a result, the second clutch C2 and the fourth clutch C4 are engaged to establish the sixth (6th) forward gear stage. The sixth (6th) forward gear stage is a high speed gear, and thus even if the driver, who believes he/she has switched to the reverse (Rev) gear stage, presses the accelerator pedal, the vehicle is considered to travel forward slightly and slowly, causing little discomfort to the driver. However, the sixth (6th) forward gear stage is not maintained and quickly disengaged. This procedure will be described below in (5).

In short, in this processing, the anomaly drain path 91 is secured by effectively using the tie-up prevention function performed by the first cutoff valve 46.

(4) In the case of the occurrence of a switching anomaly in which switching from the reverse (Rev) gear stage to the first (1st) forward gear stage is not possible, it is necessary to disengage the currently engaged fourth clutch C4 and second brake B2. In this case, by quickly causing either the fourth clutch C4 or the second brake B2 to disengage, transmission of power from the input shaft 9 to the output shaft 10, or in other words, transmission of reverse driving power from the automatic transmission 1 to the driving wheels can be interrupted quickly.

To this end, in the present embodiment, the engaging hydraulic pressure supplied to the hydraulic pressure servo 54 of the fourth clutch C4 is caused to drain from the above-described normal drain path 82, and the engaging hydraulic pressure supplied to the hydraulic pressure servo 56 of the second brake B2 is caused to drain from the drain port 44*d* of the B2 control valve 44 as indicated by a double dot-dash arrow 92 in FIGS. 11 and 13. A path extending from the hydraulic pressure servo 56 of the second brake B2 to the drain port 44*d* of the B2 control valve 44 is denoted as anomaly drain path 92 for disengagement of the second brake B2. As an anomaly drain path for disengagement of the fourth clutch C4, the normal drain path 82 is used.

The anomaly drain path 92 for disengagement of the second brake B2 is much shorter than the above-described normal drain path 83. Accordingly, the time required for draining, or in other words, the time required to disengage the second brake B2 can be shortened significantly, as a result of which transmission of power from the input shaft 9 to the output shaft 10, or in other words, transmission of reverse driving power from the automatic transmission 1 to the driving wheels can be interrupted as quickly as possible.

The processing for securing the anomaly drain path 92 will be described in further detail. When the reverse (Rev) gear stage is established, the engaging hydraulic pressure (R range pressure) is supplied from the output port R of the manual valve 42 to the first port 44*a* of the B2 control valve 44. This engaging hydraulic pressure is also supplied to the third port 45*c* of the lock-up relay valve 45 as control hydraulic pressure. This causes the first port 45*a* and the second port 45*b* of the lock-up relay valve 45 to be in communication with each other, and thus a flow path (see a solid arrow 85 in FIGS. 11 and 13) extending from the linear solenoid valve SLU to the third port 44*c* of the B2 control valve 44 opens. This is done to make a standby state so that the anomaly drain path 92 can be quickly secured when a switching anomaly as described above has occurred. In this standby state, however, in the linear solenoid valve SLU, an oil path providing communication between the solenoid modulator valve 43 and the first port 45*a* of the lock-up relay valve 45 is interrupted. For this reason, the first port 44*a* of the B2 control valve 44 and the second port 44*b* are brought into communication with each other, and the drain port 44*d* is closed.

When a switching anomaly as described above occurs in the standby state, the ECT_ECU 6 inputs a control signal to the linear solenoid valve SLU, in the linear solenoid valve SLU so as to open the oil path providing communication between the solenoid modulator valve 43 and the first port 45*a* of the lock-up relay valve 45. The control hydraulic pressure supplied from the solenoid modulator valve 43 to the linear solenoid valve SLU is thereby input to the third port 44*c* of the B2 control valve 44, whereby the second port 44*b* and the drain port 44*d* are brought into communication with each other. Consequently, the anomaly drain path 92 indicated by a double dot-dash line in FIGS. 11 and 13 is secured, and the engaging hydraulic pressure supplied to the hydraulic pressure servo 52 of the second brake B2 is drained from the drain port 44*d* of the B2 control valve 44, as a result of which the second brake B2 is disengaged.

Next, the processing of step S6 described above, or in other words, processing for draining the control hydraulic pressure establishing the anomaly drain path (91 or 92) will be described in detail by again referring to FIGS. 12 and 13.

(5) Upon completion of draining from the anomaly drain path 91 secured in (3) above, the ECT_ECU 6 opens a drain port of the second linear solenoid valve SL2, thereby causing the engaging hydraulic pressure supplied from the second linear solenoid valve SL2 to the hydraulic pressure servo 52 of the second clutch C2 to flow in the reverse direction to drain from the drain port of the second linear solenoid valve SL2, and at the same time, the ECT_ECU 6 opens a drain port of the fourth linear solenoid valve SL4, thereby causing the engaging hydraulic pressure supplied from the fourth linear solenoid valve SL4 to the hydraulic pressure servo 54 of the fourth clutch C4 to flow in the reverse direction to drain from the drain port of the fourth linear solenoid valve SL4.

The supply of control hydraulic pressure to the third port 46c and the fourth port 46d of the first cutoff valve 46 is thereby stopped, as a result of which the drain port 46e of the first cutoff valve 46 is closed.

(6) Upon completion of draining from the anomaly drain path 92 secured in (4) above, the ECT_ECU 6 opens a drain port of the linear solenoid valve SLU, thereby causing the control hydraulic pressure supplied from the linear solenoid valve SLU to the third port 44c of the B2 control valve 44 via the lock-up relay valve 45 to flow in the reverse direction as indicated by a double dot-dash arrow 93 in FIG. 13 and drain from the drain port of the linear solenoid valve SLU. As a result, the drain port 44d of the B2 control valve 44 is closed.

In the foregoing description, a configuration including the select lever 11 and the select lever position sensor 106 corresponds to the operation unit recited in the claims. A configuration including the range switching mechanism 13 and the manual valve 42 of the hydraulic control circuit 4 corresponds to the command unit recited in the claims. The ECT_ECU 6 corresponds to the management unit recited in the claims. The SBW_ECU 14 of the range switching mechanism 13 corresponds to the control unit recited in the claims. However, it is also possible to configure the ECT_ECU 6 and the SBW_ECU 14 as a single ECU. In this case, the single ECU corresponds to the management unit and the control unit that are recited in the claims. The gearshift mechanism unit 3, the hydraulic control circuit 4, the ECT_ECU 6, the select lever 11, the select lever position sensor 106, the range switching mechanism 13 and the like constitute the shift-by-wire gearshift control apparatus according to the present invention.

As described above, in the present embodiment, in the case of the occurrence of a switching anomaly from the first (1st) forward gear stage to the reverse (Rev) gear stage, or a switching anomaly from the reverse (Rev) gear stage to the first (1st) forward gear stage, the level of oil temperature in the hydraulic control circuit 4 is further checked. If the oil temperature is low, taking into consideration the fact that the viscosity is high and the flowability is poor, the engaging hydraulic pressure supplied to the relevant frictional engagement elements (clutches and brakes) is caused to drain from the relatively short anomaly drain path (91 or 92). If, on the other hand, the oil temperature in the hydraulic control circuit 4 is high, taking into consideration the fact that the viscosity is low and the flowability is good, the engaging hydraulic pressure supplied to the relevant frictional engagement elements (clutches and brakes) is caused to drain from the relatively long normal drain path (81, 82 or 83), despite the fact that a switching anomaly has occurred.

Consequently, when a switching anomaly between the forward and reverse gears occurs in a condition in which the oil temperature in the hydraulic control circuit 4 is low and the flowability is poor, the time required for draining, or in other words, the time required to disengage the frictional engagement elements (clutches and brakes) can be shortened significantly as compared with conventional techniques (in which the same drain path as used in normal operation is used even when a switching anomaly between forward and reverse gears has occurred), and therefore transmission of power from the input shaft 9 to the output shaft 10, or in other words, transmission of power from the automatic transmission 1 to the driving wheels can be interrupted as quickly as possible. With this configuration, even in the event of the occurrence of a switching anomaly, it is possible to avoid the vehicle from moving with the driving power at the range before switching, and therefore safety can be ensured.

Furthermore, even when, in order to facilitate adjustment of the line pressure of the hydraulic control circuit 4, the drain ports of the valves (for example, 42, SL1 and SL4) located on the most downstream side of the normal drain paths (81, 82 and 83) are set to be narrower than those of the other oil paths, the present embodiment enables draining of pressure as quickly as possible.

In particular, in the present embodiment, in the case of the occurrence of a switching anomaly from the first (1st) forward gear stage to the reverse (Rev) gear stage, the anomaly drain path 91 is secured by using the drain port 46e of the first cutoff valve 46 originally provided in the oil path extending from the first linear solenoid valve SL1 to the hydraulic pressure servo 51 of the first clutch C1. Likewise, in the case of the occurrence of a switching anomaly from the reverse (Rev) gear stage to the first (1st) forward gear stage, the anomaly drain path 92 is secured by using the drain port 44d of the B2 control valve 44 originally provided in the oil path extending from the manual valve 42 to the second brake B2.

As described above, instead of using new parts to secure the anomaly drain paths 91 and 92, the existing parts that are originally provided in the hydraulic control circuit 4 are used, and therefore unnecessary increase in equipment cost can be suppressed or avoided. However, it is also possible to use a configuration in which the anomaly drain paths 91 are 92 are secured by using new parts, and the present invention also encompasses such a configuration.

The present invention is not limited to the embodiments given above, and all modifications and applications encompassed within the scope of the claims and a range equivalent thereto are possible. The following provides some examples.

(1) In the above embodiment, the automatic transmission 1 capable of providing eight forward gear stages and a reverse gear stage is used as an example, but the present invention is not limited thereto, and the number of gear stages of the automatic transmission can be set to any value.

(2) In the above embodiment, the gearshift mechanism unit 3 is configured to include two planetary gear units 31 and 32, but the present invention is not limited thereto, and the number and configuration of planetary gear units can be changed as appropriate.

(3) In the above embodiment, an example has been given in which, in the case of the occurrence of a switching anomaly from the forward gear stage to the reverse gear stage or a switching anomaly from the reverse gear stage to a forward gear stage, the normal drain path (81, 82 or 83) or the anomaly drain path (91 or 92) is further selected according to the level of the oil temperature in the hydraulic control circuit 4. However, the present invention is not limited thereto, and it is also possible to, for example, always select the anomaly drain path (91 or 92) regardless of the oil temperature in the hydraulic control circuit 4, in the case of the occurrence of a switching anomaly between the forward and reverse gears.

Specifically, in the case of the occurrence of a switching anomaly from the first (1st) forward gear stage to the reverse (Rev) gear stage, the engaging hydraulic pressure supplied to the hydraulic pressure servo 51 of the first clutch C1 is caused to drain from the anomaly drain path 91. Likewise, in the case of the occurrence of a switching anomaly from the reverse (Rev) gear stage to the first (1st) forward gear stage, the engaging hydraulic pressure supplied to the hydraulic pressure servo 56 of the second brake B2 is caused to drain from the anomaly drain path 92.

Consequently, when a switching anomaly between the forward and reverse gears occurs, the engaging hydraulic pressure supplied to the hydraulic pressure servo 51 of the first clutch C1 and the engaging hydraulic pressure supplied to the hydraulic pressure servo 56 of the second brake B2 can be drained as quickly as possible, and therefore the time required for draining can be shortened significantly as compared to conventional techniques (in which the same drain path as used in normal operation is used even when a switching anomaly between forward and reverse gears has occurred).

REFERENCE SIGNS LIST

1 Automatic Transmission
1a Automatic Transmission Case
3 Gearshift Mechanism Unit
31 Front Planetary Gear Unit
32 Rear Planetary Gear Unit
33 Intermediate Drum
C1 First Clutch
C2 Second Clutch
C3 Third Clutch
C4 Fourth Clutch
B1 First Brake
B2 Second Brake
4 Hydraulic Control Circuit
41 Pressure Control Valve
42 Manual Valve
SL1 to SL4 Linear Solenoid Valves For First to Fourth Clutches
SL5 Linear Solenoid Valve For First Brake
SLU Linear Solenoid Valve
43 Solenoid Modulator Valve
44 B2 Control Valve
45 Lock-Up Relay Valve
46 to 48 First to Third Cutoff Valves
5 Oil Pump
6 ECT_ECU
7 Internal Combustion Engine
11 Select Lever
13 Range Switching Mechanism
14 SBW_ECU
15 Detent Plate
15a Manual Shaft
16 Actuator
81 to 83 Normal Drain Path
91, 92 Anomaly Drain Path
105 Range Position Sensor
106 Select Lever Position Sensor
107 Oil Temperature Sensor

The invention claimed is:

1. A shift-by-wire gearshift control apparatus that, in response to a target range signal output as a result of a driver operation, switches an automatic transmission range, the shift-by-wire gearshift control apparatus comprising:
a gearshift mechanism unit that includes a plurality of frictional engagement elements for establishing the target range and that changes rotation of an input shaft and outputs the rotation to an output shaft;
a hydraulic control circuit that secures a supply path for engaging hydraulic pressure for engaging a necessary frictional engagement element to establish the target range;
an operation unit for outputting a target range signal in response to the driver operation;
a command unit for causing the hydraulic control circuit to supply engaging hydraulic pressure for the necessary frictional engagement element in response to the target range signal; and
a management unit for, in a case of occurrence of a switching anomaly in which switching from a forward travel range to a reverse travel range or switching from the reverse travel range to the forward travel range is not possible, causing the hydraulic control circuit to secure an anomaly drain path that is shorter than a normal drain path that is secured by the hydraulic control circuit during normal switching operation, as a path for draining engaging hydraulic pressure supplied to a frictional engagement element involved in establishing an actual range,
wherein the hydraulic control circuit includes a plurality of solenoid valves for individually supplying engaging hydraulic pressure to the respective frictional engagement elements, a cutoff valve for prevention of tie-up that is provided in a path for supplying engaging hydraulic pressure to a frictional engagement element involved in establishing the forward travel range and that interrupts or permits supply of engaging hydraulic pressure to the frictional engagement element from the solenoid valve as necessary, and a valve for supplying control hydraulic pressure for opening a drain port to the cutoff valve in order to secure the anomaly drain path, and
the management unit sets, as an anomaly drain path secured in the case of the occurrence of the switching anomaly from the forward travel range to the reverse travel range, a path that causes the engaging hydraulic pressure supplied to the frictional engagement element involved in establishing the forward travel range to drain from a drain port of the cutoff valve, and causes the control hydraulic pressure for opening a drain port supplied to the cutoff valve to drain after draining from the anomaly drain path.

2. The shift-by-wire gearshift control apparatus according to claim 1,
wherein in the case of the occurrence of the switching anomaly, the management unit first determines whether or not oil temperature in the hydraulic control circuit is less than a threshold value, and causes the hydraulic control circuit to secure the anomaly drain path if the oil temperature is less than the threshold value, and causes the hydraulic control circuit to secure the normal drain path if the oil temperature is greater than or equal to the threshold value.

3. The shift-by-wire gearshift control apparatus according to claim 1,
wherein the management unit includes an identification unit that identifies a currently established actual range and an anomaly determining unit that determines whether or not the switching anomaly has occurred, and
the anomaly determining unit checks whether or not the target range and the actual range identified by the identification unit match.

4. The shift-by-wire gearshift control apparatus according to claim 1,
wherein the command unit includes a manual valve for supplying the engaging hydraulic pressure to an appropriate frictional engagement element via an appropriate solenoid valve, an actuator for actuating the manual valve, and a control unit for controlling an operation of the solenoid valve and the actuator in response to the target range signal.

5. The shift-by-wire gearshift control apparatus according to claim 1, wherein the gearshift mechanism unit includes a double pinion type front planetary gear unit that is provided on an upstream side in a power transmission direction and a ravigneaux type rear planetary gear unit that is provided on a downstream side in the power transmission direction, and a carrier of the front planetary gear unit is coupled to the input shaft and a ring gear of the rear planetary gear unit is coupled to the output shaft, the frictional engagement elements include:

a first clutch for causing a ring gear of the front planetary gear unit and a small-diameter sun gear of the rear planetary gear unit to be capable of integral rotation or relative rotation;

a second clutch for causing the input shaft and a carrier of the rear planetary gear unit to be capable of integral rotation or relative rotation;

a third clutch for causing the ring gear of the front planetary gear unit and a large-diameter sun gear of the rear planetary gear unit to be capable of integral rotation or relative rotation;

a fourth clutch for causing the carrier of the front planetary gear unit and the large-diameter sun gear of the rear planetary gear unit to be capable of integral rotation or relative rotation;

an intermediate rotator for integrally coupling the large-diameter sun gear of the rear planetary gear unit, a free side friction plate of the third clutch and a free side friction plate of the fourth clutch;

a first brake for causing the intermediate rotator to be rotatable or non-rotatable; and a second brake for causing the carrier of the rear planetary gear unit to be rotatable or non-rotatable, and a first forward gear stage in the forward travel range is established when only the first clutch is engaged, and the reverse travel range is established when the fourth clutch and the second brake are engaged.

6. A shift-by-wire gearshift control apparatus that, in response to a target range signal output as a result of a driver operation, switches an automatic transmission range, the shift-by-wire gearshift control apparatus comprising:

a gearshift mechanism unit that includes a plurality of frictional engagement elements for establishing the target range and that changes rotation of an input shaft and outputs the rotation to an output shaft;

a hydraulic control circuit that secures a supply path for engaging hydraulic pressure for engaging a necessary frictional engagement element to establish the target range;

an operation unit for outputting a target range signal in response to the driver operation; and a command unit for causing the hydraulic control circuit to supply engaging hydraulic pressure for the necessary frictional engagement element in response to the target range signal;

the gearshift mechanism unit including a double pinion type front planetary gear unit that is provided on an upstream side in a power transmission direction and a ravigneaux type rear planetary gear unit that is provided on a downstream side in the power transmission direction, and a carrier of the front planetary gear unit being coupled to the input shaft and a ring gear of the rear planetary gear unit being coupled to the output shaft, the frictional engagement elements including:

a first clutch for causing a ring gear of the front planetary gear unit and a small-diameter sun gear of the rear planetary gear unit to be capable of integral rotation or relative rotation;

a second clutch for causing the input shaft and a carrier of the rear planetary gear unit to be capable of integral rotation or relative rotation;

a third clutch for causing the ring gear of the front planetary gear unit and a large-diameter sun gear of the rear planetary gear unit to be capable of integral rotation or relative rotation;

a fourth clutch for causing the carrier of the front planetary gear unit and the large-diameter sun gear of the rear planetary gear unit to be capable of integral rotation or relative rotation;

an intermediate rotator for integrally coupling the large-diameter sun gear of the rear planetary gear unit, a free side friction plate of the third clutch and a free side friction plate of the fourth clutch;

a first brake for causing the intermediate rotator to be rotatable or non-rotatable; and a second brake for causing the carrier of the rear planetary gear unit to be rotatable or non-rotatable, wherein a first forward gear stage in the forward travel range is established when only the first clutch is engaged, and the reverse travel range is established when the fourth clutch and the second brake are engaged; and a management unit for, in a case of occurrence of a switching anomaly in which switching from the first forward gear stage in the forward travel range to the reverse travel range or switching from the reverse travel range to the first forward gear stage in the forward travel range is not possible, causing the hydraulic control circuit to secure an anomaly drain path that is shorter than a normal drain path that is secured by the hydraulic control circuit during normal switching operation, as a path for draining engaging hydraulic pressure supplied to a frictional engagement element involved in establishing an actual range, wherein the hydraulic control circuit includes a plurality of solenoid valves for individually supplying engaging hydraulic pressure to the first to fourth clutches and the first and second brakes, and a cutoff valve for prevention of tie-up that is provided between the first clutch and a solenoid valve for supplying engaging hydraulic pressure thereto and that interrupts or permits supply of engaging hydraulic pressure to the first clutch as necessary, and a valve for supplying control hydraulic pressure for opening a drain port to the cutoff valve in order to secure the anomaly drain path, and the management unit sets, as an anomaly drain path secured in the case of the occurrence of the switching anomaly from the first forward gear stage in the forward travel range to the reverse travel range, a path that causes the engaging hydraulic pressure supplied to the first clutch to drain from a drain port of the cutoff valve, and causes the control hydraulic pressure for opening a drain port supplied to the cutoff valve to drain after draining from the anomaly drain path.

7. A shift-by-wire gearshift control apparatus that, in response to a target range signal output as a result of a driver operation, switches an automatic transmission range, the shift-by-wire gearshift control apparatus comprising:

a gearshift mechanism unit that includes a plurality of frictional engagement elements for establishing the target range and that changes rotation of an input shaft and outputs the rotation to an output shaft;

a hydraulic control circuit that secures a supply path for engaging hydraulic pressure for engaging a necessary frictional engagement element to establish the target range;

an operation unit for outputting a target range signal in response to the driver operation; and a command unit for causing the hydraulic control circuit to supply engaging hydraulic pressure for the necessary frictional engagement element in response to the target range signal;

the gearshift mechanism unit including a double pinion type front planetary gear unit that is provided on an upstream side in a power transmission direction and a ravigneaux type rear planetary gear unit that is provided on a downstream side in the power transmission direction, and a carrier of the front planetary gear unit being coupled to the input shaft and a ring gear of the rear planetary gear unit being coupled to the output shaft, the frictional engagement elements including:

a first clutch for causing a ring gear of the front planetary gear unit and a small-diameter sun gear of the rear planetary gear unit to be capable of integral rotation or relative rotation;

a second clutch for causing the input shaft and a carrier of the rear planetary gear unit to be capable of integral rotation or relative rotation;

a third clutch for causing the ring gear of the front planetary gear unit and a large-diameter sun gear of the rear planetary gear unit to be capable of integral rotation or relative rotation;

a fourth clutch for causing the carrier of the front planetary gear unit and the large-diameter sun gear of the rear planetary gear unit to be capable of integral rotation or relative rotation;

an intermediate rotator for integrally coupling the large-diameter sun gear of the rear planetary gear unit, a free side friction plate of the third clutch and a free side friction plate of the fourth clutch;

a first brake for causing the intermediate rotator to be rotatable or non-rotatable; and a second brake for causing the carrier of the rear planetary gear unit to be rotatable or non-rotatable, wherein a first forward gear stage in the forward travel range is established when only the first clutch is engaged, and the reverse travel range is established when the fourth clutch and the second brake are engaged; and a management unit for, in a case of occurrence of a switching anomaly in which switching from the first forward gear stage in the forward travel range to the reverse travel range or switching from the reverse travel range to the first forward gear stage in the forward travel range is not possible, causing the hydraulic control circuit to secure an anomaly drain path that is shorter than a normal drain path that is secured by the hydraulic control circuit during normal switching operation, as a path for draining engaging hydraulic pressure supplied to a frictional engagement element involved in establishing an actual range, wherein the hydraulic control circuit includes a plurality of solenoid valves for individually supplying engaging hydraulic pressure to the first to fourth clutches and the first and second brakes, a cutoff valve for prevention of tie-up that is provided between the fourth clutch and a solenoid valve for supplying engaging hydraulic pressure thereto and that interrupts or permits supply of engaging hydraulic pressure to the fourth clutch as necessary, a valve for supplying engaging hydraulic pressure supplied to the second brake to the second brake, a manual valve for supplying the engaging hydraulic pressure to an appropriate frictional engagement element via an appropriate solenoid valve, and a valve for supplying control hydraulic pressure for opening a drain port to the valve for supplying engaging hydraulic pressure to the second brake in order to secure the anomaly drain path, in the hydraulic control circuit, a distance between the second brake and the valve for supplying engaging hydraulic pressure to the second brake is set shorter than a distance between the second brake and the manual valve, and the management unit sets, as an anomaly drain path secured in the case of the occurrence of the switching anomaly from the reverse travel range to the first forward gear stage in the forward travel range, a path that causes the engaging hydraulic pressure supplied to the second brake to drain from a drain port of the valve for supplying engaging hydraulic pressure to the second brake and causes the control hydraulic pressure for opening a drain port supplied to the valve for supplying engaging hydraulic pressure to the second brake to drain after draining from the anomaly drain path.

8. The shift-by-wire gearshift control apparatus according to claim 6, wherein in the case of the occurrence of the switching anomaly, the management unit first determines whether or not oil temperature in the hydraulic control circuit is less than a threshold value, and causes the hydraulic control circuit to secure the anomaly drain path if the oil temperature is less than the threshold value, and causes the hydraulic control circuit to secure the normal drain path if the oil temperature is greater than or equal to the threshold value.

9. The shift-by-wire gearshift control apparatus according to claim 2, wherein the management unit includes an identification unit that identifies a currently established actual range and an anomaly determining unit that determines whether or not the switching anomaly has occurred, and the anomaly determining unit checks whether or not the target range and the actual range identified by the identification unit match.

10. The shift-by-wire gearshift control apparatus according to claim 2, wherein the command unit includes a manual valve for supplying the engaging hydraulic pressure to an appropriate frictional engagement element via an appropriate solenoid valve, an actuator for actuating the manual valve, and a control unit for controlling an operation of the solenoid valve and the actuator in response to the target range signal.

11. The shift-by-wire gearshift control apparatus according to claim 3, wherein the command unit includes a manual valve for supplying the engaging hydraulic pressure to an appropriate frictional engagement element via an appropriate solenoid valve, an actuator for actuating the manual valve, and a control unit for controlling an operation of the solenoid valve and the actuator in response to the target range signal.

12. The shift-by-wire gearshift control apparatus according to claim 2, wherein the gearshift mechanism unit includes a double pinion type front planetary gear unit that is provided on an upstream side in a power transmission direction and a ravigneaux type rear planetary gear unit that is provided on a downstream side in the power transmission direction, and a carrier of the front planetary gear unit is coupled to the input shaft and a ring gear of the rear planetary gear unit is coupled to the output shaft, the frictional engagement elements include:

a first clutch for causing a ring gear of the front planetary gear unit and a small-diameter sun gear of the rear planetary gear unit to be capable of integral rotation or relative rotation;

a second clutch for causing the input shaft and a carrier of the rear planetary gear unit to be capable of integral rotation or relative rotation;

a third clutch for causing the ring gear of the front planetary gear unit and a large-diameter sun gear of the rear planetary gear unit to be capable of integral rotation or relative rotation;

a fourth clutch for causing the carrier of the front planetary gear unit and the large-diameter sun gear of the rear planetary gear unit to be capable of integral rotation or relative rotation;

an intermediate rotator for integrally coupling the large-diameter sun gear of the rear planetary gear unit, a free side friction plate of the third clutch and a free side friction plate of the fourth clutch;

a first brake for causing the intermediate rotator to be rotatable or non-rotatable; and a second brake for causing the carrier of the rear planetary gear unit to be rotatable or non-rotatable, and a first forward gear stage in the forward travel range is established when only the first clutch is engaged, and the reverse travel range is established when the fourth clutch and the second brake are engaged.

13. The shift-by-wire gearshift control apparatus according to claim 3, wherein the gearshift mechanism unit includes a double pinion type front planetary gear unit that is provided on an upstream side in a power transmission direction and a ravigneaux type rear planetary gear unit that is provided on a downstream side in the power transmission direction, and a carrier of the front planetary gear unit is coupled to the input shaft and a ring gear of the rear planetary gear unit is coupled to the output shaft, the frictional engagement elements include:

a first clutch for causing a ring gear of the front planetary gear unit and a small-diameter sun gear of the rear planetary gear unit to be capable of integral rotation or relative rotation;

a second clutch for causing the input shaft and a carrier of the rear planetary gear unit to be capable of integral rotation or relative rotation;

a third clutch for causing the ring gear of the front planetary gear unit and a large-diameter sun gear of the rear planetary gear unit to be capable of integral rotation or relative rotation;

a fourth clutch for causing the carrier of the front planetary gear unit and the large-diameter sun gear of the rear planetary gear unit to be capable of integral rotation or relative rotation;

an intermediate rotator for integrally coupling the large-diameter sun gear of the rear planetary gear unit, a free side friction plate of the third clutch and a free side friction plate of the fourth clutch;

a first brake for causing the intermediate rotator to be rotatable or non-rotatable; and a second brake for causing the carrier of the rear planetary gear unit to be rotatable or non-rotatable, and a first forward gear stage in the forward travel range is established when only the first clutch is engaged, and the reverse travel range is established when the fourth clutch and the second brake are engaged.

14. The shift-by-wire gearshift control apparatus according to claim 4, wherein the gearshift mechanism unit includes a double pinion type front planetary gear unit that is provided on an upstream side in a power transmission direction and a ravigneaux type rear planetary gear unit that is provided on a downstream side in the power transmission direction, and a carrier of the front planetary gear unit is coupled to the input shaft and a ring gear of the rear planetary gear unit is coupled to the output shaft, the frictional engagement elements include:

a first clutch for causing a ring gear of the front planetary gear unit and a small-diameter sun gear of the rear planetary gear unit to be capable of integral rotation or relative rotation;

a second clutch for causing the input shaft and a carrier of the rear planetary gear unit to be capable of integral rotation or relative rotation;

a third clutch for causing the ring gear of the front planetary gear unit and a large-diameter sun gear of the rear planetary gear unit to be capable of integral rotation or relative rotation;

a fourth clutch for causing the carrier of the front planetary gear unit and the large-diameter sun gear of the rear planetary gear unit to be capable of integral rotation or relative rotation;

an intermediate rotator for integrally coupling the large-diameter sun gear of the rear planetary gear unit, a free side friction plate of the third clutch and a free side friction plate of the fourth clutch;

a first brake for causing the intermediate rotator to be rotatable or non-rotatable; and a second brake for causing the carrier of the rear planetary gear unit to be rotatable or non-rotatable, and a first forward gear stage in the forward travel range is established when only the first clutch is engaged, and the reverse travel range is established when the fourth clutch and the second brake are engaged.

15. The shift-by-wire gearshift control apparatus according to claim 7, wherein in the case of the occurrence of the switching anomaly, the management unit first determines whether or not oil temperature in the hydraulic control circuit is less than a threshold value, and causes the hydraulic control circuit to secure the anomaly drain path if the oil temperature is less than the threshold value, and causes the hydraulic control circuit to secure the normal drain path if the oil temperature is greater than or equal to the threshold value.

* * * * *